US007535584B2

(12) United States Patent
Sakai et al.

(10) Patent No.: US 7,535,584 B2
(45) Date of Patent: May 19, 2009

(54) TAPE PRINTING APPARATUS, DATA PROCESSING METHOD FOR TAPE PRINTING APPARATUS, PRINTING SYSTEM, DATA PROCESSING METHOD FOR PRINTING SYSTEM, COMPUTER PROGRAM AND STORAGE MEDIUM

(75) Inventors: Mamoru Sakai, Kawasaki (JP); Mikihiro Kajihara, Matsumoto (JP); Hiroshi Ono, Tokyo (JP)

(73) Assignees: Seiko Epson Corporation, Tokyo (JP); King Jim Co., Ltd., Tokyo (JP)

( * ) Notice: Subject to any disclaimer, the term of this patent is extended or adjusted under 35 U.S.C. 154(b) by 918 days.

(21) Appl. No.: 10/970,371

(22) Filed: Oct. 21, 2004

(65) Prior Publication Data

US 2005/0105104 A1 May 19, 2005

(30) Foreign Application Priority Data

Oct. 31, 2003 (JP) ............................ 2003-373211

(51) Int. Cl.
*G06K 1/00* (2006.01)

(52) U.S. Cl. ...................................... 358/1.1; 400/611

(58) Field of Classification Search ................. 358/1.1; 400/613.1, 621, 611
See application file for complete search history.

(56) References Cited

U.S. PATENT DOCUMENTS 5,538,352 A * 7/1996 Sugiura ................... 400/615.2
5,795,086 A * 8/1998 Watanabe et al. ........ 400/615.2
5,823,689 A * 10/1998 Nehowig et al. .............. 400/83
6,113,294 A * 9/2000 Niwa .......................... 400/621
6,739,777 B2 * 5/2004 Kobayashi et al. .......... 400/621

FOREIGN PATENT DOCUMENTS

JP 2000-341496 * 12/2000

* cited by examiner

*Primary Examiner*—Kimberly A Williams
(74) *Attorney, Agent, or Firm*—Hogan & Hartson LLP

(57) ABSTRACT

Basic image data serving as a source of print image data is stored. The loading of a special tape is detected when the print image based on the print image data is printed on the special tape having a particular non-printing area. The print image data is generated and then printed with non-printing area image data out of the basic image data masked.

22 Claims, 23 Drawing Sheets

TAPE PRINTING APPARATUS, DATA PROCESSING METHOD FOR TAPE PRINTING APPARATUS, PRINTING SYSTEM, DATA PROCESSING METHOD FOR PRINTING SYSTEM, COMPUTER PROGRAM AND STORAGE MEDIUM

BACKGROUND OF THE INVENTION

1. Field of the Invention

This invention relates to a tape printing apparatus, a data processing method for the tape printing apparatus, a computer program, and a storage medium for printing data on a special tape having a particular non-printing area in addition to a portion common to all tapes. This invention also relates to a separate printing system including a supply apparatus for supplying print image data and a tape printing apparatus for printing on a tape a print image based on the supplied print image data, a data processing method for the printing system, a computer program, and a storage medium. More particularly, this invention relates to a printing system that prints data on a special tape having a particular non-printing area in addition to a portion common to all tapes, a data processing method for the printing system, a computer program and a storage medium.

2. Description of the Related Art

To print data on a tape across a full width thereof, a print head of a tape printing apparatus must have a print width wider than the width of the tape. To cause the print head width to be completely equal to the width of the tape is very difficult because of a variety of error factors. If the tape is printed in excess of the full width thereof, overextension printing damages a platen, and smears related portions, possibly leading to degradation in print quality. In a known tape printing apparatus, margin portions (overextension print disable areas) are arranged on both edges of the width of the tape as a non-printing area common to all tapes to avoid printing in excess of the full width of the tape, and a printing operation is performed taking into consideration the margin portions.

A special tape having a particular non-printing area in addition to the non-printing area common to all tapes has been developed. For example, some tapes have a groove serving as a fold line or a perforated broken line longitudinally extending along a center line (see FIGS. 6B and 6C, and FIGS. 7B and 7C). The printing of a print image on the center line bearing a fold line is not preferable because deformation due to heating and ink smearing take place along the center line. A longitudinally running band containing the center line is preferably defined as a non-printing area.

However, known tape printing apparatuses are unable to perform a printing process matching a non-printing area particular to each tape, and users are forced to perform a complex manual operation. In a separate type printing system, a tape printing apparatus in one office is separated from a supply apparatus in another office. In such a case, an operator is unable to directly view a tape cartridge loaded in the tape printing apparatus, and has difficulty in recognizing the type of the tape (of whether or not the tape is a special one) on the supply apparatus.

SUMMARY OF THE INVENTION

Accordingly, it is an advantage of this invention to provide a tape printing apparatus, a data processing method for the tape printing apparatus, a printing system, a data processing method for the printing system, a computer program, and a storage medium for printing a print image, matching a non-printing area, on a special tape having a particular non-printing area.

According to one aspect of this invention, there is provided a tape printing apparatus for printing a print image onto a tape of at least one type having a particular non-printing area corresponding to the type of the tape. The apparatus comprises: basic image storage means for storing basic image data serving as a source of print image data; non-printing area information storage means for storing non-printing area information indicating the non-printing area corresponding to the type of the tape; tape type setting means for setting the type information of the tape that is loaded; and print image producing means for producing the print image data with the basic image data masked based on the non-printing area information corresponding to the type information of the loaded tape.

According to another aspect of this invention, there is provided a data processing method for a tape printing apparatus for printing a print image onto a tape of at least one type having a particular non-printing area corresponding to the type of the tape. The method comprises: a basic image storage step for storing basic image data serving as a source of print image data; a non-printing area information storage step for storing non-printing area information indicating the non-printing area corresponding to the type of the tape; a tape type setting step for setting the type information of the tape that is loaded; and a print image producing step for producing the print image data with the basic image data masked based on the non-printing area information indicating the non-printing area corresponding to the type information of the loaded tape.

In accordance with the above-described tape printing apparatus and the data processing method of this invention, the type of the loaded tape is set in connection with at least one tape with the particular non-printing area defined corresponding to the type of tape. With the non-printing area image data of the non-printing area corresponding to the set type, of the basic image data, masked, the print image data is generated. The print image based on the print image data is thus printed. The print image matching the non-printing area is printed for each of the plurality of tapes having different non-printing areas (namely, for a special tape having a particular non-printing area).

According to yet another aspect of this invention, there is provided a tape printing apparatus for printing a print image onto a tape of at least one type having a particular non-printing area corresponding to the type of the tape. The apparatus comprises: basic image storage means for storing basic image data serving as a source of print image data; non-printing area information storage means for storing non-printing area information indicating the non-printing area corresponding to the type of the tape; tape type setting means for setting the type information of the tape that is loaded; display means for displaying on a display screen an image of the external shape of the loaded tape and the non-printing area corresponding to the loaded tape; and print image producing means for producing the print image data by editing a basic image so that the basic image falls within an area in the external shape but outside the non-printing area shown in the display screen.

According to a further aspect of this invention, there is provided a data processing method for a tape printing apparatus for printing a print image onto a tape of at least one type having a particular non-printing area corresponding to the type of the tape. The method comprises: a basic image storage step for storing basic image data serving as a source of print image data; a non-printing area information storage step for storing non-printing area information indicating the non-printing area corresponding to the type of the tape; a tape type setting step for setting the type information of the tape that is loaded; a display step for displaying on a display screen an image of the external shape of the loaded tape and the non-printing area corresponding to the loaded tape; and a print image producing step for producing the print image data by editing a basic image so that the basic image falls within an area in the external shape but outside the non-printing area shown in the display screen.

In accordance with the above-described tape printing apparatus and the data processing method of this invention, the image of the external shape of the loaded tape and the non-printing area is displayed on the display screen, and the print image is edited so that print image falls within the area in the tape external shape and outside the non-printing area shown in the display screen. Viewing the non-printing area of each loaded tape, the print image is easily produced and printed so that printing is kept out of the non-printing area.

According to a further aspect of this invention, there is provided a tape printing apparatus for printing a print image with a non-printing area selectively set within an external shape of a loaded tape. The apparatus comprises: non-printing area information storage means for storing non-printing area information indicating a plurality of mutually different types of non-printing areas; non-printing area selecting means for selecting one of the plurality of types of non-printing areas; basic image storage means for storing basic image data serving as a source of print image data; and print image producing means for producing the print image data with the basic image data masked based on the non-printing area information of the selected non-printing area.

According to a further aspect of this invention, there is provided a data processing method for a tape printing apparatus for printing a print image with a non-printing area selectively set within an external shape of a loaded tape. The method comprises: a non-printing area information storage step for storing non-printing area information indicating a plurality of mutually different types of non-printing areas; a non-printing area selecting step for selecting one of the plurality of types of non-printing areas; a basic image storage step for storing basic image data serving as a source of print image data; and a print image producing step for producing the print image data with the basic image data masked based on the non-printing area information of the selected non-printing area.

In accordance with the tape printing apparatus and the data processing method of this invention, the non-printing area information indicating a plurality of types of non-printing areas and the basic image data serving as the source of the print image data are stored. One of the non-printing areas is selected. Based on the selected non-printing area, the print image data is produced with the basic image data masked. The print image is thus printed. A print image matching the non-printing area is printed with each of the non-printing area set for each of a variety of tapes (including a special tape having a particular non-printing area).

According to a further aspect of this invention, there is provided a tape printing apparatus for printing a print image with a non-printing area selectively set within an external shape of a loaded tape. The apparatus comprises: non-printing area information storage means for storing non-printing area information indicating a plurality of mutually different types of non-printing areas; non-printing area selecting means for selecting one of the plurality of types of non-printing areas; display means for displaying on a display screen an image of the external shape of the tape and the non-printing areas; and print image producing means for producing the print image data by editing the print image so that the print image falls within an area in the external shape but outside the non-printing area shown in the display screen.

According to a further aspect of this invention, there is provided a data processing method for a tape printing apparatus for printing a print image with a non-printing area selectively set within an external shape of a loaded tape. The method comprises: a non-printing area information storage step for storing non-printing area information indicating a plurality of mutually different types of non-printing areas; a non-printing area selecting step for selecting one of the plurality of types of non-printing areas; a display step for displaying on a display screen an image of the external shape of the tape and the non-printing areas; and a print image producing step for producing the print image data by editing the print image so that the print image falls within an area in the external shape but outside the non-printing area shown in the display screen.

In accordance with the tape printing apparatus and the data processing method of this invention, the non-printing area information indicating the plurality of non-printing areas is stored. One of the plurality of non-printing areas is selected. The type of the loaded tape is detected or set. The image of the external shape of the loaded tape and the non-printing area is displayed on the display screen. The print image is edited so that the print image falls within the area in the tape external shape and outside the non-printing area shown in the display screen. Viewing the non-printing area of each loaded tape, the print image is easily produced and printed so that printing is kept out of the non-printing area.

According to a further aspect of this invention, there is provided a printing system for printing print image data onto a tape of at least one type having a particular non-printing area corresponding to the type of the tape. The system comprise: a supply apparatus for supplying the print image data through an interface; and a tape printing apparatus for printing on the tape the print image data supplied through the interface. The tape printing apparatus comprises tape type information reporting means for setting type information of a loaded tape and reporting to the supply apparatus the type information. The supply apparatus comprises: basic image storage means for storing basic image data serving as a source of the print image data; modified image producing means for producing modified image data with the basic image data masked based on the non-printing area information corresponding to the reported type information of the tape; and image data supplying means for supplying the modified image data as the print image data to the tape printing apparatus.

According to a further aspect of this invention, there is provided a data processing method for a printing system for printing print image data, supplied from a supply apparatus to a tape printing apparatus through an interface, onto a tape of at least one type having a particular non-printing area corresponding to the type of the tape. The method comprises: a tape type information reporting step for setting type information of the loaded tape and reporting to the supply apparatus the type information; a basic image storage step for storing basic image data serving as a source of the print image data; a modified image producing step for producing modified image data with the basic image data masked based on the non-printing area information indicating the non-printing area corresponding to the reported type information of the tape; and an image data supplying step for supplying the modified image data as the print image data to the tape printing apparatus.

According to a further aspect of this invention, there is provided a printing system for printing print image data onto a tape of at least one type having a particular non-printing area corresponding to the type of the tape. The system comprises: a supply apparatus for supplying the print image data through an interface; and a tape printing apparatus for printing on the tape the print image data supplied through the interface. The supply apparatus comprises: tape type information setting means for setting a loaded tape as a special tape; basic image storage means for storing basic image data serving as a source of the print image data; modified image producing means for producing modified image data with the basic image data masked based on the non-printing area information corresponding to the type information of the loaded tape; and image data supplying means for supplying the modified image data as the print image data to the tape printing apparatus.

According to a further aspect of this invention, there is provided a data processing method for a printing system for printing print image data, supplied from a supply apparatus to a tape printing apparatus through an interface, onto a tape of at least one type having a particular non-printing area corresponding to the type of the tape. The method comprises: a tape type information setting step for setting the loaded tape as a special tape; a basic image storage step for storing basic image data serving as a source of the print image data; a modified image producing step for producing modified image data with the basic image data masked based on the non-printing area information corresponding to the type of the loaded tape; and an image data supplying step for supplying the modified image data as the print image data to the tape printing apparatus.

According to a further aspect of this invention, there is provided a printing system for printing print image data onto a tape of at least one type having a particular non-printing area corresponding to the type of the tape. The system comprises: a supply apparatus for supplying the print image data through an interface; and a tape printing apparatus for printing on the tape the print image data supplied through the interface. The tape printing apparatus comprises tape type information reporting means for setting type information of a loaded tape and reporting to the supply apparatus the type information. The supply apparatus comprises: display means for displaying on a display screen an image of the external shape of the special tape and the non-printing area; modified image producing means for producing modified image data by editing a basic image serving as a source of a print image so that the basic image falls within an area in the external shape but outside the non-printing area shown in the display screen; and image data supplying means for supplying the modified image data as the print image data to the tape printing apparatus.

According to a further aspect of this invention, there is provided a data processing method for a printing system for printing print image data, supplied from a supply apparatus to a tape printing apparatus through an interface, onto a tape of at least one type having a particular non-printing area corresponding to the type of the tape. The method comprises: a tape type information reporting step for setting type information of a loaded tape and reporting to the supply apparatus the type information; a display step for displaying on a display screen an image of the external shape of the special tape and the non-printing area; a modified image producing step for producing modified image data by editing a basic image serving as a source of a print image so that the basic image falls within an area in the external shape but outside the non-printing area shown in the display screen; and an image data supplying step for supplying the modified image data as the print image data to the tape printing apparatus.

In accordance with the printing system and the data processing method of this invention, the supply apparatus displays the image of the external shape of the loaded tape and the non-printing area corresponding to the loaded tape on the display screen. The supply apparatus produces the modified image data by editing the basic image serving as the source of the print image so that basic image falls within the area in the tape external shape and outside the non-printing area shown in the display screen. Viewing the non-printing area of each loaded tape, the basic image is easily edited so that printing is kept out of the non-printing area. The supply apparatus supplies the tape printing apparatus with the modified image data as the print image data. The print image kept out of the non-printing area of each loaded tape is easily produced and printed.

According to a further aspect of this invention, there is provided a printing system for printing print image data with a non-printing area selectively set within an external shape of a loaded tape. The system comprises: a supply apparatus for supplying the print image data through an interface; and a tape printing apparatus for printing on the tape the print image data supplied through the interface. The supply apparatus comprises: non-printing area information storage means for storing non-printing area information indicating a plurality of mutually different types of non-printing areas; non-printing area selecting means for selecting one of the plurality of types of non-printing areas; basic image storage means for storing basic image data serving as a source of the print image data; modified image producing means for producing modified image data with the basic image data masked based on the non-printing area information of the selected non-printing area; and image data supplying means for supplying the modified image data as the print image data to the tape printing apparatus.

According to a further aspect of this invention, there is provided a data processing method for a printing system for printing print image data, supplied to a tape printing apparatus from a supply apparatus through an interface, with a non-printing area selectively set within an external shape of a tape loaded in the tape printing apparatus. The method comprises: a non-printing area information storage step for storing non-printing area information indicating a plurality of mutually different types of non-printing areas; a non-printing area selecting step for selecting one of the plurality of types of non-printing areas; a basic image storage step for storing basic image data serving as a source of the print image data; a modified image producing step for producing modified image data with the basic image data masked based on the non-printing area information of the selected non-printing area; and an image data supplying step for supplying the modified image data as the print image data to the tape printing apparatus.

In accordance with the printing system and the data processing method of this invention, the supply apparatus stores the non-printing information indicating the plurality of non-printing areas and the basic image data serving as the source of the print image data, and selects one of the non-printing areas. Based on the selected non-printing area, the supply apparatus produces the modified image data with the basic image data masked. The supply apparatus supplies the tape printing apparatus with the modified image data as the print image data. The tape printing apparatus prints the print image based on the print image data. The tape printing apparatus thus prints the print image matching the non-printing area with each of the non-printing areas set for a variety of tapes (including a special tape having a particular non-printing area).

According to a further aspect of this invention, there is provided a printing system for printing print image data with a non-printing area selectively set within an external shape of a loaded tape. The system comprises: a supply apparatus for supplying the print image data through an interface; and a tape printing apparatus for printing on the tape the print image data supplied through the interface. The supply apparatus comprises: display means for displaying on a display screen an image of the selected non-printing area and the external shape of the tape; modified image producing means for producing modified image data by editing a basic image serving as a source of a print image so that the basic image falls within an area in the external shape but outside the non-printing area shown in the display screen; and image data supplying means for supplying the modified image data as the print image data to the tape printing apparatus.

According to a further aspect of this invention, there is provided a data processing method for a printing system for printing print image data, supplied to a tape printing apparatus from a supply apparatus through an interface, with a non-printing area selectively set within an external shape of a tape loaded in the tape printing apparatus. The method comprises: a non-printing area information storage step for storing non-printing area information indicating a plurality of mutually different types of non-printing areas; a non-printing area selecting step for selecting one of the plurality of types of non-printing areas; a display step for displaying on a display screen an image of the selected non-printing area and the external shape of the tape; a modified image producing step for producing modified image data by editing a basic image serving as a source of a print image so that the basic image falls within an area in the external shape but outside the non-printing area shown in the display screen; and an image data supplying step for supplying the modified image data as the print image data to the tape printing apparatus.

In accordance with the printing system and the data processing method of this invention, the supply apparatus stores the non-printing information indicating the plurality of non-printing areas, and then selects one of the non-printing areas. The supply apparatus displays an image of the selected non-printing area and the external shape of the tape on the display screen. The supply apparatus produces the modified image data by editing the basic image serving as the source of the print image so that the basic image falls within the area in the tape external shape and outside the non-printing area shown in the display screen. Viewing the non-printing area of each loaded tape, the basic image is edited so that printing is kept out of the non-printing area. The supply apparatus supplies the tape printing apparatus with the modified image data as the print image data. The tape printing apparatus prints the print image based on the print image data. The tape printing apparatus thus sets the non-printing area for each of the loaded tapes (including the special tape having a particular non-printing area), thereby easily producing and printing the print image kept out of the non-printing area.

A computer program of this invention causes a computer to perform the function of the tape printing apparatus or the printing system.

Another computer program of this invention causes a computer to perform the data processing method.

Each of the tape printing apparatus and the printing system with the computer program running therein prints the print image matching the non-printing area on the special tape having the particular non-printing area.

A storage medium of this invention stores the computer program in a manner that allows the printing system to read the computer program.

Each of the tape printing apparatus and the printing system reads the computer program stored in the storage medium, and executes the computer program, thereby printing the print image matching the non-printing area on the special tape having the particular non-printing area.

BRIEF DESCRIPTION OF THE DRAWINGS

FIGS. 22A-22C illustrate a label and setting of a mask image (including a printing area and a non-printing area) corresponding to the special tape of FIGS. 21A-21C.

DETAILED DESCRIPTION OF THE PREFERRED EMBODIMENTS

A tape printing apparatus 1 of a first preferred embodiment of this invention is described below with reference to the accompanying drawings.

Figure 1:
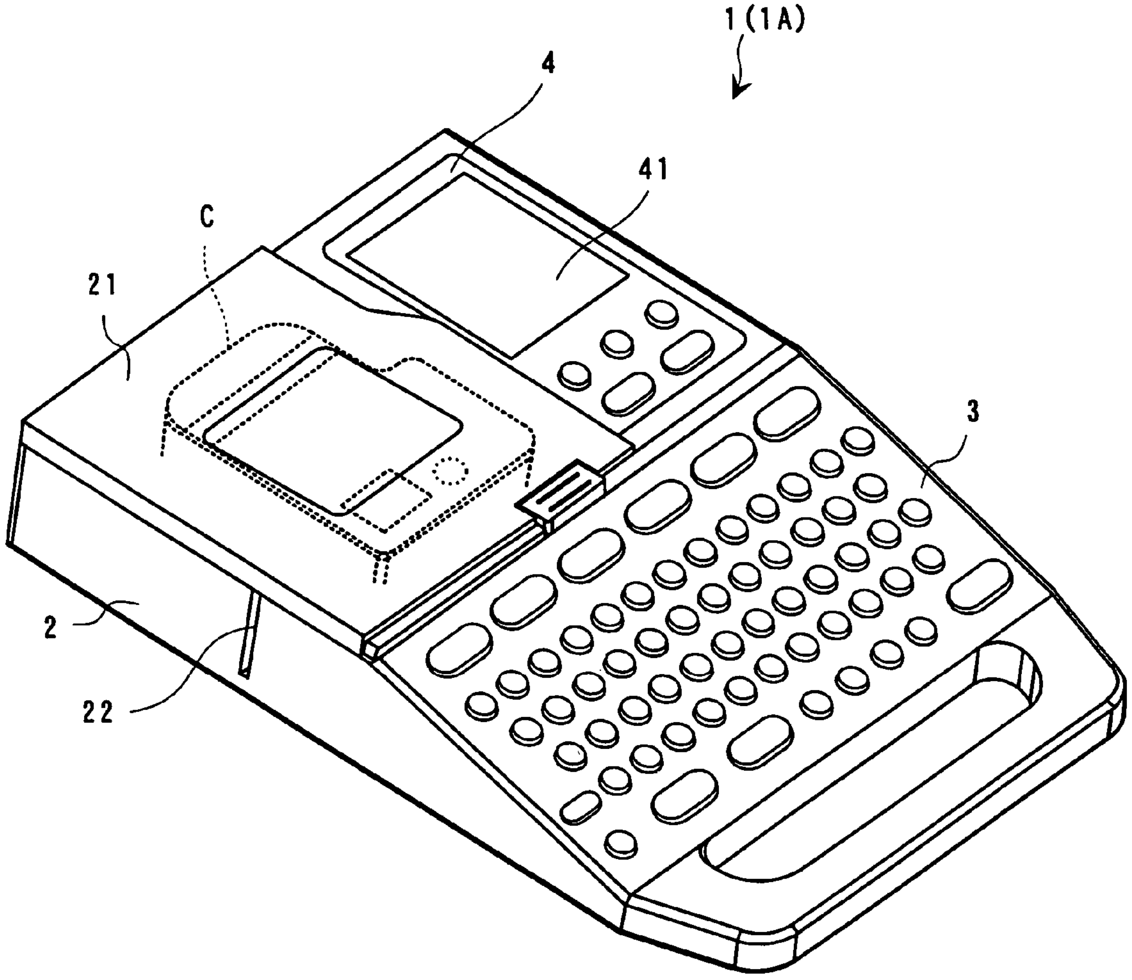
FIG. 1 is a perspective view of a tape printing apparatus in accordance with one preferred embodiment of this invention.
Figure 2A:
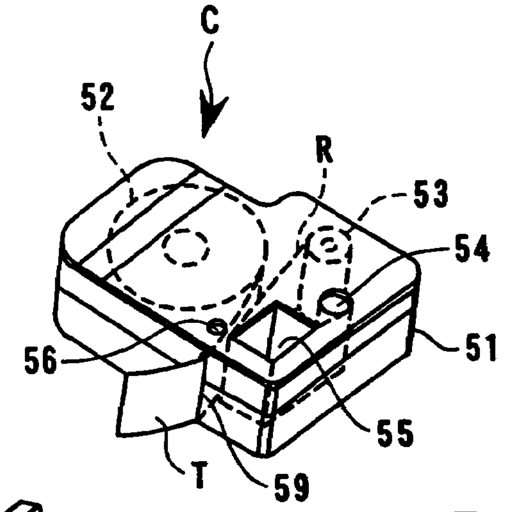
FIGS. 2A and 2B are perspective views of the tape printing apparatus of FIG. 1 with the cover thereof opened.
Figure 2B:
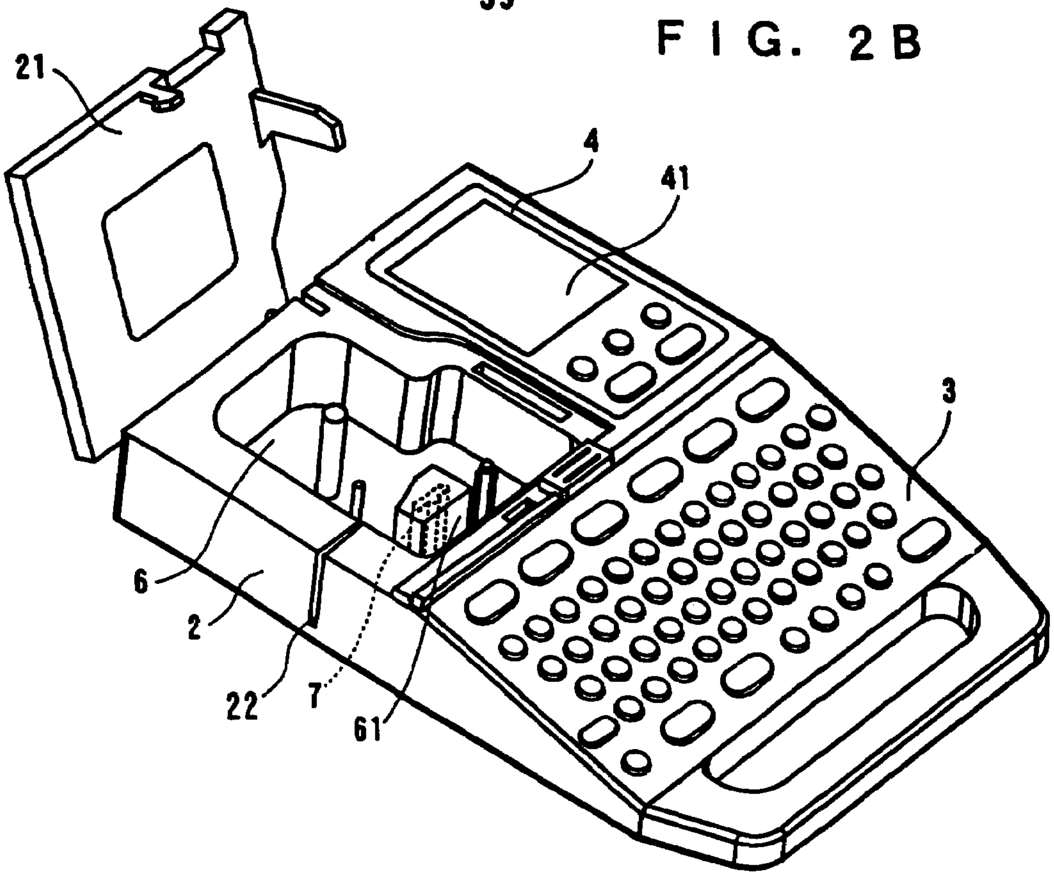

As shown in FIG. 1 and FIGS. 2A and 2B, the tape printing apparatus 1 includes an apparatus case 2 and a keyboard 3 including various input keys on the top front portion the apparatus case 2. A cover 21 is provided on the left-hand side of the top rear portion of the apparatus case 2. Arranged on the right-hand side is a display 4. A slit-like tape discharge port 22 is opened outwardly to the left-side end face of the apparatus case 2 for communication with a pocket (tape socket) 6. A tape cutter 132 is arranged, facing the tape discharge port 22 to cut a printing tape (T) paid out.

Figure 3:
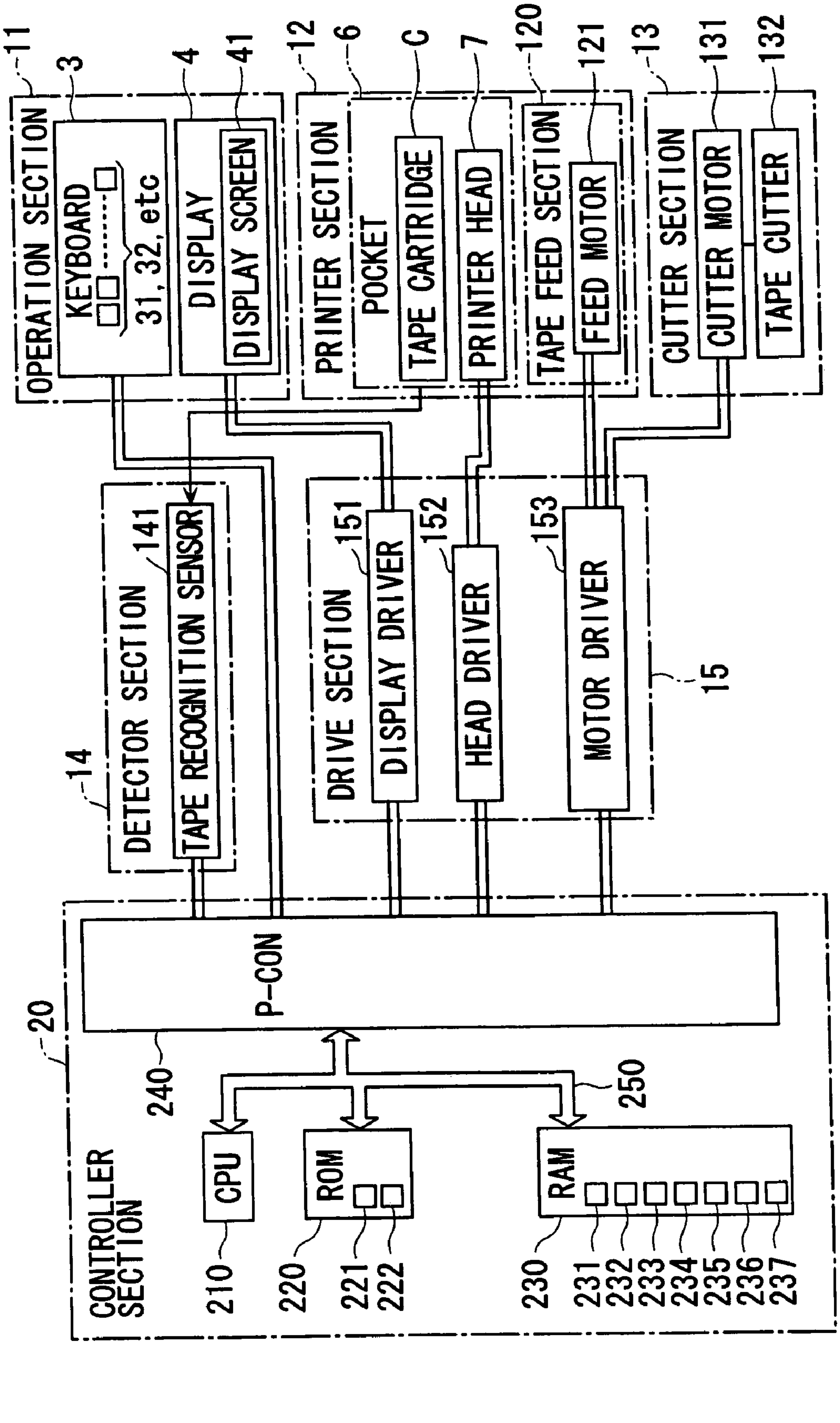
FIG. 3 is a block diagram of a control system of the tape printing apparatus of FIG. 1.

As shown in FIG. 3, the tape printing apparatus 1 includes, in a control system thereof, an operation section 11 including the keyboard 3 and the display 4, serving as a user interface, a printer section 12, including a printer (thermal) head 7 and a tape feed section 120, for printing information on the tape T in a tape cartridge C loaded in the pocket 6, a cutter section 13 for cutting the tape T subsequent to a printing operation, a detector section 14, including various sensors, for performing various detections, a drive section 15, including drivers, for driving circuits, and a controller section 20 for controlling each block in the tape printing apparatus 1. The apparatus case 2 houses a circuit board (not shown) in addition to the printer section 12, the cutter section 13, and the detector section 14. The circuit board bears a power unit besides circuits for the drive section 15 and the controller section 20, and is connected to an AC adaptor socket 29 and a battery (not shown), such as a nickel-cadmium battery, detachably mounted from the outside.

A user loads a tape cartridge C into the pocket 6, and input print information such as desired characters (letters, numerals, symbols, simple figures, etc.) using the keyboard 3 while viewing input and edited results on the display 4 in the tape printing apparatus 1. When the user inputs a print command, the tape feed section 120 feeds the tape T from the tape cartridge C, the printer head 7 prints desired information on the tape T, and the printed portion of the tape T is discharged from the tape discharge port 22 as appropriate. When a desired print is completed, the tape feed section 120 feeds out the tape T to a tape length including a margin, and then stops paying out (or feeding) the tape T.

Referring to FIGS. 2A and 2B and FIG. 3, the printer section 12 includes, inside the cover 21, the pocket 6 that receives the tape cartridge C. With the cover 21 opened, the tape cartridge C is loaded into or unloaded from the pocket 6. A plurality of perforations (not shown) is arranged in the bottom side of the tape cartridge C to identify the type of the tape T in terms of the width of the tape T. A tape recognition sensor 141, such as a micro switch, for recognizing (or detecting) the presence or absence of the perforations is mounted on the pocket 6. The tape recognition sensor 141 thus detects the presence or absence of the tape T (more exactly, whether or not the tape cartridge C is loaded), and the type of the tape T (more exactly, the type of the tape cartridge C).

The tape cartridge C houses, in a cartridge case 51, a tape T having a constant width (4.5 mm to 48 mm) and an ink ribbon R. The tape cartridge C has an opening 55 facing the printer head 7. The tape T has an adhesive backside covered with a peel sheet. In alignment with the printer head 7 in a head unit 61, a platen roller 56 is arranged where the tape T joins the ink ribbon R. With the tape cartridge C loaded, the printer head 7 is put into contact with the backside of the ink ribbon R exposed from the opening 55. The printer head 7 is driven and heated to print desired characters on the tape T.

The tape feed section 120 is arranged in space extending from the one side to the other side of the pocket 6, and includes a feed motor 121 as a driver. When the cover 21 is closed with the tape cartridge C loaded in the pocket 6, the feed motor 121 feeds the tape T from a tape reel 52, and feeds out the ink ribbon R from a ribbon payout (feeding) reel 53. The printer head 7 presses the tape T and the ink ribbon R together against the platen roller 56 at the opening 55. The tape T and the ink ribbon R run in the overlay state thereof, and the printer head 7 is driven in synchronization for printing. The ink ribbon R is taken up by a tape take-up reel 54 while only the tape T is discharged out of the tape cartridge C. With the platen roller 56 continuously rotating (the tape take-up reel 54 also rotating) for a predetermined period of time, the tape T advances, and is discharged out of the tape printing apparatus 1 through the tape discharge port 22. A predetermined cutting position of the tape T reaches the tape cutter 132.

The cutter section 13 includes a tape cutter 132 and a cutter motor 131 for driving the tape cutter 132. The cutter section 13 is selected between an automatic mode and a manual mode. For any desired length printing, the cutter motor 131 is operated using a cut key in the manual mode, and for a fixed length printing, the cutter motor 131 is operated in the automatic mode. The detector section 14 includes various sensors in blocks in the tape printing apparatus 1 in addition to the previously discussed tape recognition sensor 141. The drive section 15 includes a display driver 151, a head driver 152, and a motor driver 153. In response to a control signal from the controller section 20, the display driver 151 drives the display 4 of the operation section 11. Similarly, the head driver 152 drives the printer head 7 in the printer section 12, and the motor driver 153 drives a feed motor 121 in the printer section 12, and a cutter motor 131 in the cutter section 13.

The operation section 11 includes the keyboard 3 and the display 4. The display 4, having a rectangular shape of about 6 cm in a horizontal (X) direction by about 4 cm vertical (Y) direction, includes a displays screen 41 of 96 dots by 64 dots displaying data, and 18 indicators (not shown) for displaying settings. The display 4 is used when a user inputs data through the keyboard 3 to produce and edit print image data such as character string image data, to visually recognize the print image data, or when the user inputs a variety of commands through the keyboard 3.

The keyboard 3 includes character keys 31 including alphanumeric keys, kana keys, such as hira kana keys and kata kana keys, external character keys for calling and selecting external keys, and function keys 32 for designating an operation mode.

The function keys 32 include a power key, a print key for issuing a print command, a selection key for selecting data and feeding line during text input, or for selecting a mode on a selection screen, a cancel key for canceling each operation, a delete key for quitting each operation, or for deleting a character, etc., after selection, a cut key for manual cutting operation, and four cursor keys for moving a cursor or a display area of the display screen 41 upward, downward, leftward, or rightward. These keys may be individually arranged, or may be reduced in number by combining the keys with a shift key or other keys. The keyboard 3 allows a variety of commands to be entered to the controller section 20 in response to each of these keys.

The controller section 20 includes a CPU 210, an ROM 220, an RAM 230, and a peripheral control (P-CONT) circuit 240, all mutually connected to each other via an internal bus 250. The ROM 220 includes a control program area 221 for storing a control program of the CPU 210, and a control data area 222 for storing font data of characters (including numerals, symbols, and graphics) available within the apparatus, a color conversion table, and a font attribute table. The RAM 230, backed up during power off period, includes a flag register group 231, a text data area 232, a display image data area 233, a print image data area 234, a render registered image data area 235, an external character registration image data area 236, a buffer area 237 for character expansion buffer and a print buffer, and is used as a working area for a variety of processes.

The P-CON 240, arranged in a gate array or a custom LSI, assists the CPU 210 and includes function circuits such as a logical circuit for handling interface signals with peripheral circuits and a timer for measuring time. The P-CON 240 is connected to various sensors in the detector section 14 and the keyboard 3, and receives detected signals, commands, and input data directly or in the modified form thereof into the internal bus 250, and outputs, to the drive section 15, data and control signals output to the internal bus 250 from the CPU 210 directly or in the modified form thereof in cooperation with the CPU 210.

Under the control of the control program in the ROM 220, the CPU 210 receives detected signals, commands, and various data through the P-CON 240, processes data in the ROM 220 and the RAM 230, and outputs control signals to the drive section 15 through P-CON 240. The CPU 210 generally controls the tape printing apparatus 1. More specifically, the CPU 210 controls the position of printing and the displaying of the display screen 41 while also controlling the printer head 7 to print data on the tape T under a predetermined condition.

Figure 4:
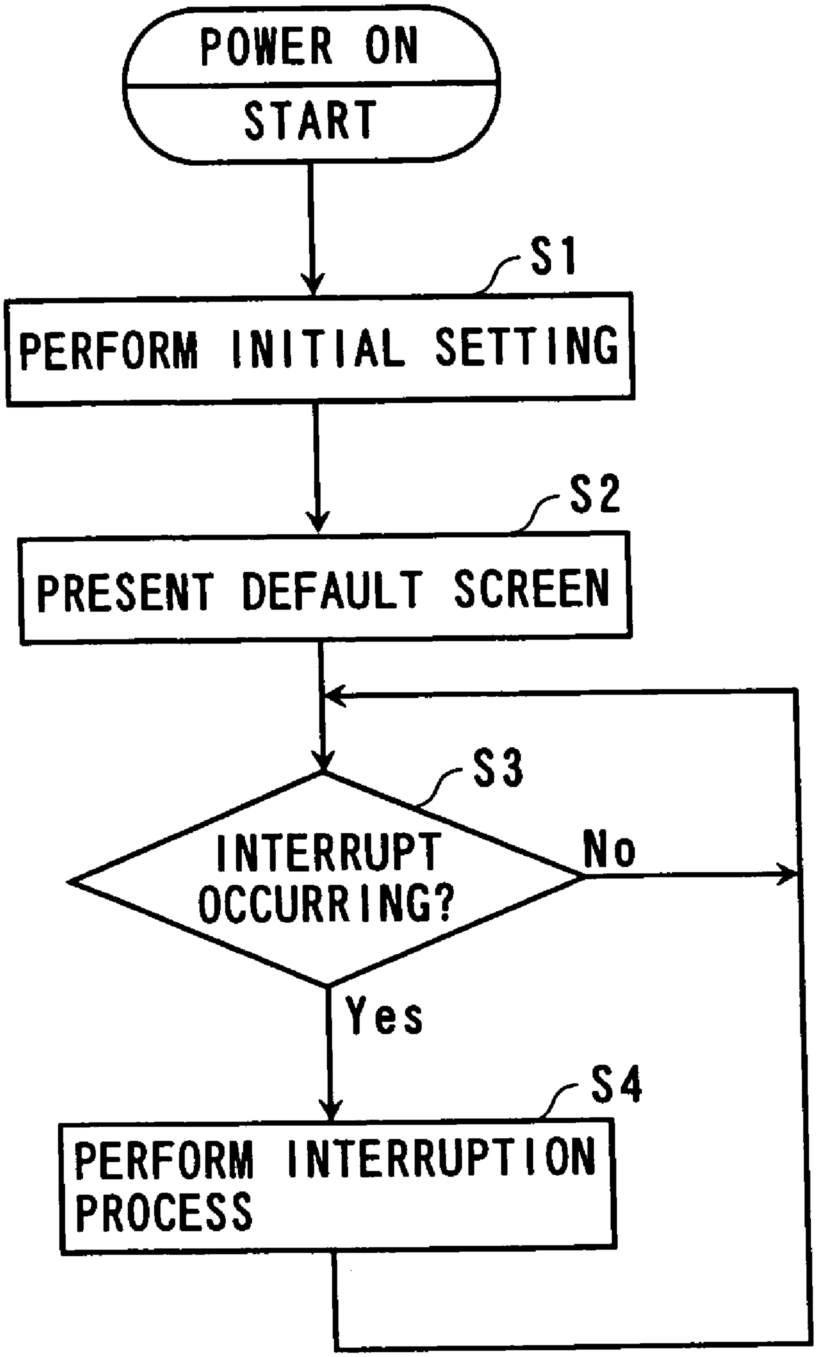
FIG. 4 is a flowchart generally illustrating a control process of the tape printing apparatus.

The control process of the tape printing apparatus 1 is described below with reference to FIG. 4. When the power key is selected (for power on), an initial setting is performed to restore each saved control flag to resume the state prior to last power off (step S1). A previous display screen is presented as a default screen (step S2).

The algorithm (or procedure) proceeds to a determination step of whether a key input is present (step S3) and an interruption process (step S4). More specifically, when a default screen is displayed (step S2) in the tape printing apparatus 1, an interrupt, such as a key input, is permitted. Until any interrupt takes place, the tape printing apparatus 1 remains on standby (i.e., no in step S3). If any interrupt takes place (i.e., yes in step D3), the algorithm proceeds to an interruption process (step S4). When the interruption process ends, the tape printing apparatus 1 remains on standby (i.e., no in step S3).

The tape printing apparatus 1 performs a main process in the interruption process as discussed above. When a user selects a print key at any time with a print image prepared, a print process interrupt takes place. A print process is thus initiated, causing a print image to be printed based on print image data. In other words, the selection of the operational procedure up to printing is up to the user.

Figure 5A:
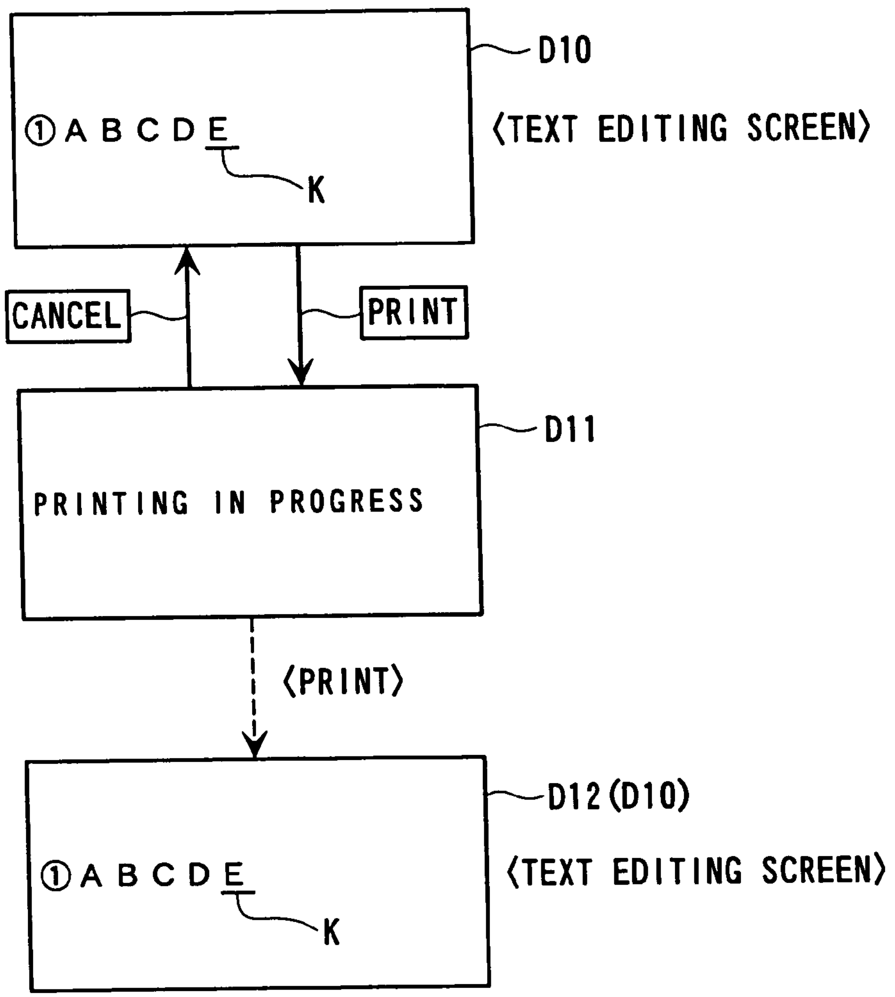
FIG. 5A illustrates a display screen for printing and a typical operation thereof.

As shown in FIG. 5A, the user selects the print key in a text editing screen with a character string "ABCDE" at a first row to a cursor K input (hereinafter referred to as screen D10). Hereinafter, each of the display screen 41 is referred to as Dxx (x is an integer). With a message "printing in progress" (D11), an image of the character string "ABCDE" is printed as an image G00 on a tape T having a tape width of TW, and the tape T is cut to a setting (a label length LW in accordance with a constant length setting or a variable length setting) to produce a label L00 (see FIG. 5B). When the printing is completed, the default text editing screen (D12 identical to D10) appears. The user can cancel each command by key input using the cancel key on the tape printing apparatus 1. For example, by selecting the cancel key in the above-discussed state (D11), the tape printing apparatus 1 returns to the display state (D10) of the default text editing screen.

Since the tape printing apparatus 1 is enabled to print the print image matching the non-printing area on the special tape having the particular non-printing area in addition the areas common to all tapes. The non-printing area is described further below.

Figure 6A:
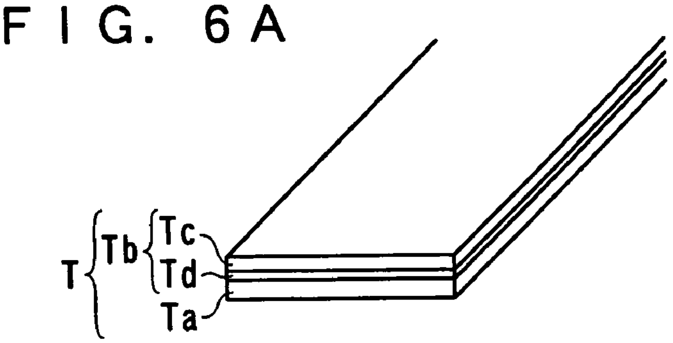
FIGS. 6A-6D illustrate the structures of a standard tape and a special tape.

As shown in FIG. 6A, a typically available tape T (hereinafter referred to as a standard tape as opposed to a "special tape" for discrimination) includes a laminate of a peel tape Ta and a base tape Tb. The base tape Tb includes an image layer Tc on the print surface thereof, and an adhesive layer Td arranged on the backside (adhesive surface). After the printing operation (production of the label), the adhesive layer Td is exposed by detaching the peel tape Ta from the base tape Tb. The tape T is thus glued onto an object with the adhesive layer Td thereof sticking to the object.

Figure 6B:
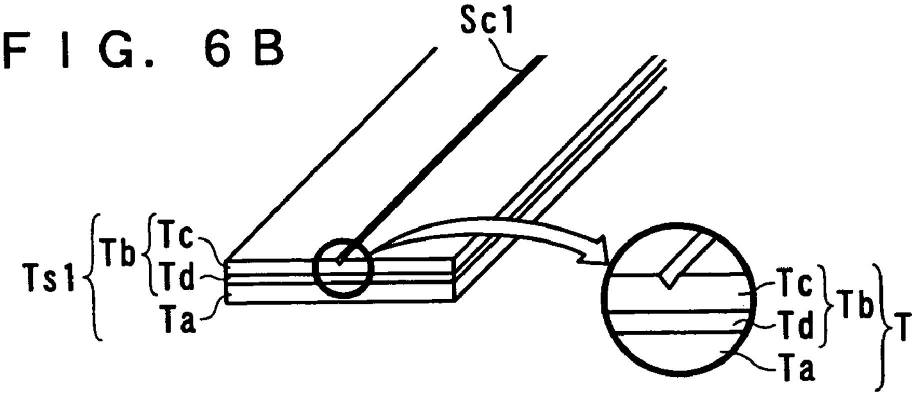
Figure 6C:
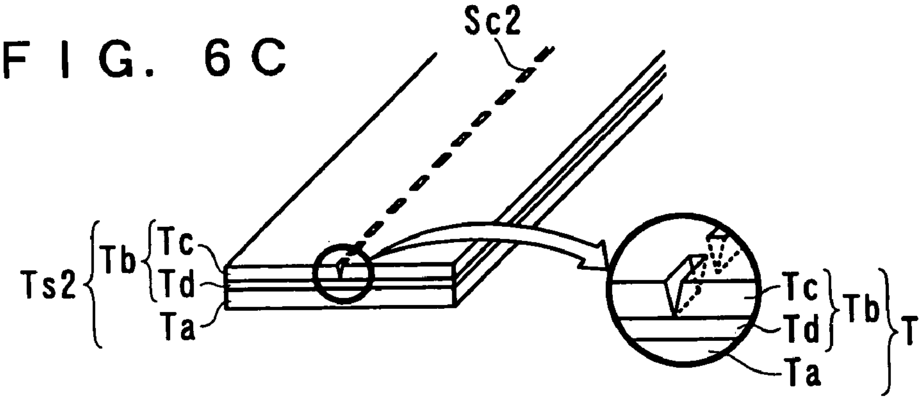

As shown in FIG. 6B, a tape Ts of type 1 as a special tape Ts1 has a groove as a fold line Sc1 along a center line longitudinally extending the tape. The groove is as deep as half the thickness of the image layer Tc (surface layer of the base tape Tb). As shown in FIG. 6C, the tape Ts of type 2 as a special tape Ts2 has a chain of grooves as a fold line Sc2 along a center line longitudinally extending the tape. The chain of grooves is as deep as the image layer Tc.

Figure 7A:
FIGS. 7A-7D illustrate the result of printing corresponding to the tapes of FIGS. 6A-6D.
Figure 7B:
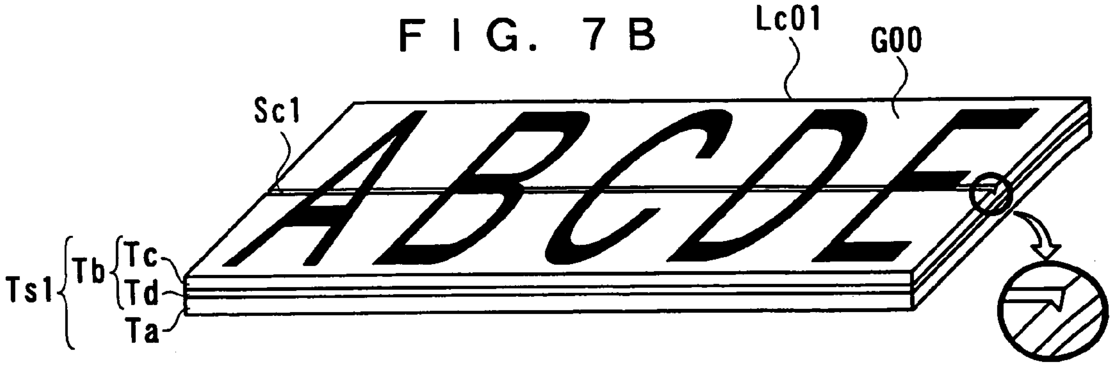
Figure 7C:

If a label is produced by printing a print image G00 of the character string "ABCDE" on the tape having no non-printing area, the tape becomes the one shown in FIG. 7A. In the case of the standard tape T, the label L00 (see FIG. 5B) is produced as shown in FIG. 6A. In the case of the special tape Ts1, the label Lc01 having the fold line Sc1 shown in FIG. 6B is produced, and in the case of the special tape Ts2, the label Lc02 having the fold line Sc2 shown in FIG. 6C is produced.

Figure 6D:
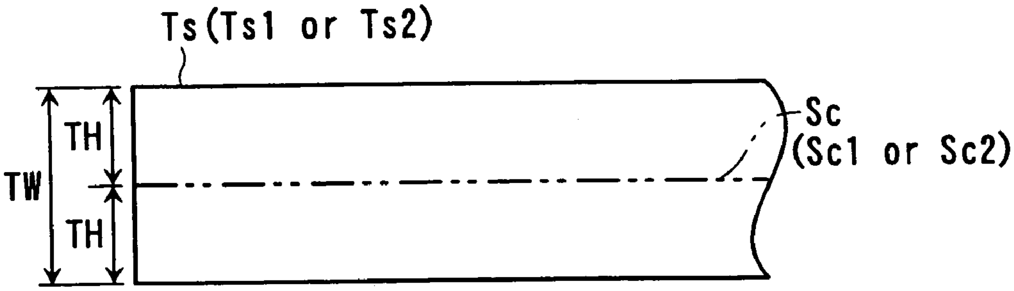
Figure 7D:
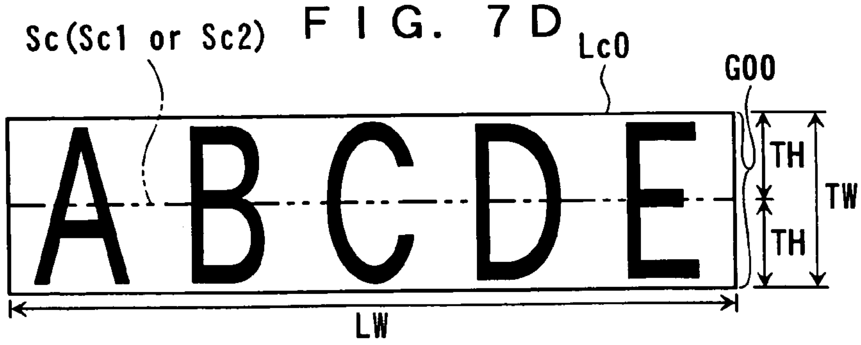

The two special tapes Ts1 and Ts2 are shown in FIG. 6D and the labels Ls01 and Ls02 respectively produced therefrom are shown in FIG. 7D. More specifically, a special tape Ts has a fold line Sc that is provided along the center line spaced from each of the side edges of the tape Ts having a full width of TW by a distance of TH=TW/2, and a label Lc0 is produced from the tape Ts.

The printing of the print image G00 or the like on the fold line (center line) Sc of the special tape Ts is not preferable because distortion due to heating and ink smearing can take place along the fold line. The fold line Sc and the area surrounding the fold line Sc are preferably set to be a non-printing area.

The tape printing apparatus 1 detects the type of the loaded tape T using the tape recognition sensor 141. If the loaded tape is a special tape Ts, the tape printing apparatus 1 prepares mask image data MS0 (non-printing area image data) of a mask image MS0 for masking the non-printing area in response to image data (basic image data) of an original print image (basic image) G00, namely, basic image data that could be printed as the print image G00 if directly printed.

To simplify the following discussion, the basic image and the basic image data of the basic image are collectively referred to as "the basic image", for example, "basic image G000", and the mask image and the mask image data of the mask image are collectively referred to as "the mask image", for example, "mask image MS0", and the print image and the print image data of the print image are collectively referred to as "the print image", for example, "print image GS0". The mask image (data) MS0 is prepared (stored) as the non-printing area of the special tape Ts. Alternatively, specification information only may be stored as the non-printing area information, and the mask image MS0 may be produced when the special tape Ts is detected.

Figure 8A:
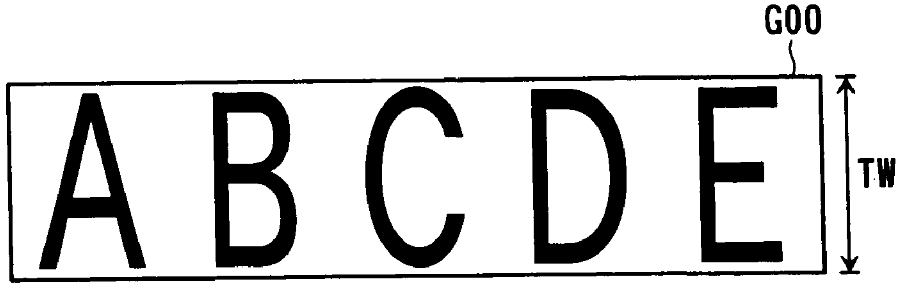
FIG. 8A illustrates a basic image of one example.
Figure 8B:
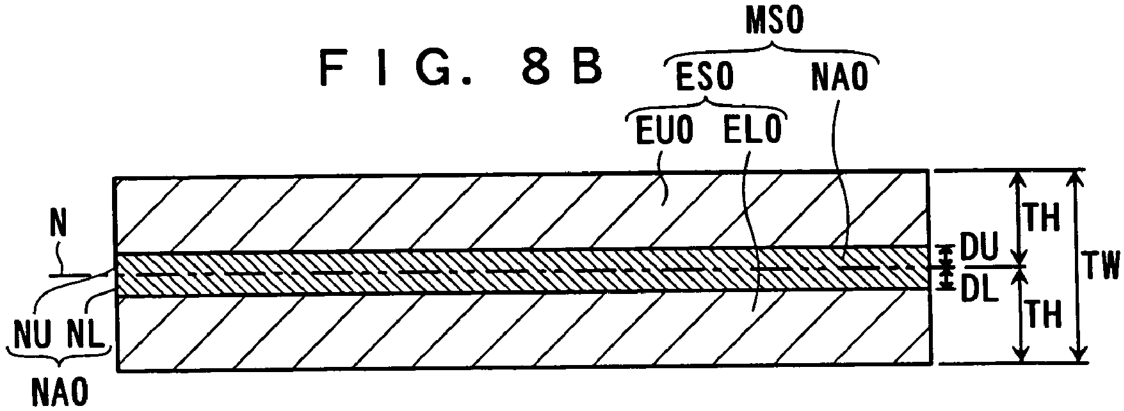
FIG. 8B illustrates a mask image of the example.
Figure 8C:
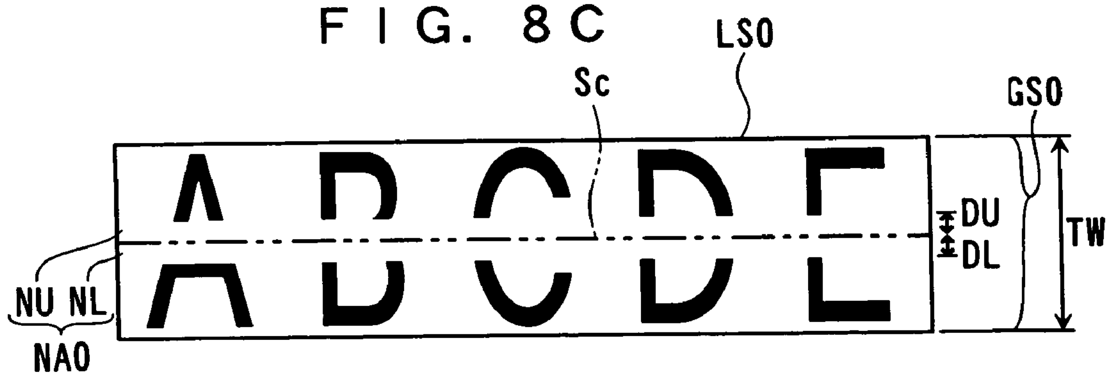
FIG. 8C illustrates a print image and a label produced and printed as a result of AND gating of the basic image and the mask image.

In the basic image G00 shown in FIG. 8A, a pixel to be printed (namely, a portion of each character of the character string ABCDE shown in black) is a logically positive dot, and the remaining portion (the background of each character shown in white) is a logically negative dot. The mask image MS0 of FIG. 8B is an image of a dot matrix containing a negative dot forming the non-printing area NA0 and a positive dot forming a print area. The corresponding dots of the basic image G00 in FIG. 8A and the mask image MS0 in FIG. 8B are AND gated, thereby resulting in a positive dot if two corresponding positive dots are positive and a negative dot if two corresponding dots are negative or if one dot is negative and the other dot corresponding thereto is positive. As shown in FIG. 8C, the print image GS0 with the basic image G00 masked by the non-printing area NA0 is easily produced.

The special tape Ts of FIG. 8B has a band-like center non-printing area (longitudinal non-printing area) longitudinally extending along the center line N as a particular non-printing area NA0. More specifically, the special tape Ts has the center non-printing area NA0 including an upper non-printing area NU having a narrow width DU above the center line and a lower non-printing area NL having a narrow width DL below the center line, in other words, NA0=NU+NL as shown in FIG. 8B. The printing area ES0 includes an upper printing area EU0 and a lower printing area EL0, in other words, ES0=EU0+EL0. The print image GS0 with a mask of the non-printing area NA0 is produced and printed. The print image GS0 matching the non-printing area NA0 is thus printed on the special tape Ts.

The above-referenced special tape Ts has the fold line Sc along the center line N at the center of the width thereof in the non-printing area NA0. The tape printing apparatus 1 sets the fold line Sc and the area surrounding the fold line Sc as the non-printing area NA0, and produces and prints the print image GS0 with these areas masked. Distortion due to heating and ink smearing that could take place along the center line N (fold line Sc) are thus controlled.

As the standard tape T, the special tape Ts includes a base tape Tb having a print surface (image layer) Tc on the top side thereof, and a adhesive layer Td, and a peel tape Ta covering the adhesive layer Td. The base tape Tb is notched in groove along the fold line Sc in a full or partial thickness thereof (see FIGS. 6D and 7D). After printing, the special tape Ts is easily folded along the notched fold line Sc (center line N). This arrangement prevents distortion due to heating and ink smearing while maintaining the ease of folding at the same time.

As discussed above, the tape printing apparatus 1 of the preferred embodiment of this invention detects the loading of the special tape Ts, masks the non-printing area out of the basic image G00 upon detecting the special tape Ts, and prints the print image GS0. The tape printing apparatus 1 thus prints the print image GS0 matching the non-printing area NA0 on the special tape Ts having the particular non-printing area NA0 in addition to areas common to all tapes.

In the above discussion, the particular non-printing area is the non-printing area NA0 (=NU+NL) along the center line N. Alternatively, a non-printing area may extend over the full width of the special tape Ts within a predetermined longitudinal length along the special tape Ts.

Figure 9A:
FIG. 9A illustrates a basic image of another example.
Figure 9B:
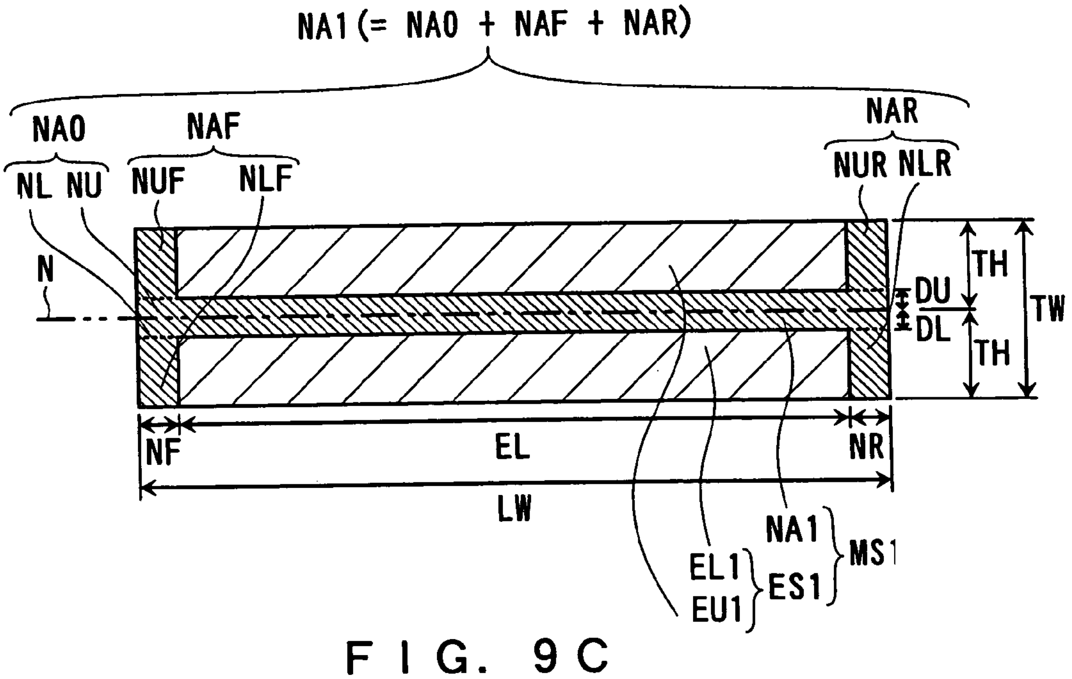
FIG. 9B illustrates a mask image of the example.

For example, when a print length LW (the label length in the longitudinal direction of the special tape Ts) is set in a constant length setting as shown in FIG. 9B, a leading edge and a trailing edge of the special tape Ts are preferably desired as a non-printing area (margin) to store the label LS1 or to peel the peel tape Ta. Defined in addition to the non-printing area NA0 in the special tape Ts are a printing area ES1 having an effective print length EL (including upper printing area EU1+lower printing area EL1), a leading edge non-printing area NAF having a length NF (=upper leading edge non-printing area NUF+lower leading edge non-printing area NLF), and a trailing edge non-printing area NAR having a length NR (=upper trailing edge non-printing area NUR+lower training edge non-printing area NLR).

Figure 9C:
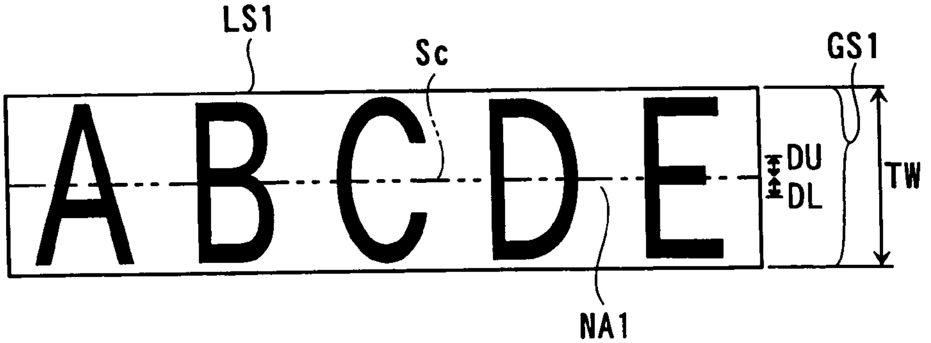
FIG. 9C illustrates a print image and a label produced and printed as a result of AND gating of the basic image and the mask image.

The special tape Ts has a non-printing area NA1 (=NA0+NAF+NAR), and a printing area NA1 (=EU1+EL1). As shown in FIG. 9B, a mask image MS1 includes the non-printing area NA1 formed of the negative dots and a printing area ES1 formed of the positive dots. The tape printing apparatus 1 AND gates the mask image MS1 with the basic image G00 of FIG. 9A, thereby causing a print image GS1 with the basic image G00 masked by the non-printing area NA1 as shown in FIG. 9C.

The special tape Ts has the non-printing area NA1 having a predetermined longitudinal length and fully extending across the width of the tape Ts, namely, a transverse non-printing area (part of NAF+NA0 or part of NAR+NA0). The print image GS1 matching the non-printing area NA1 is printed on that special tape Ts.

Figure 10A:
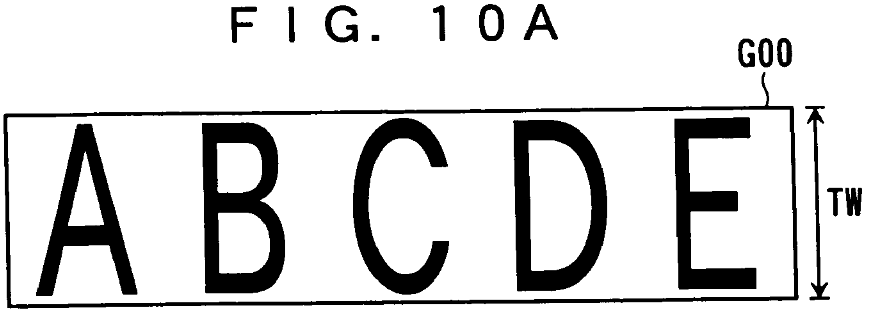
FIG. 10A illustrates a basic image of yet another example.
Figure 10B:
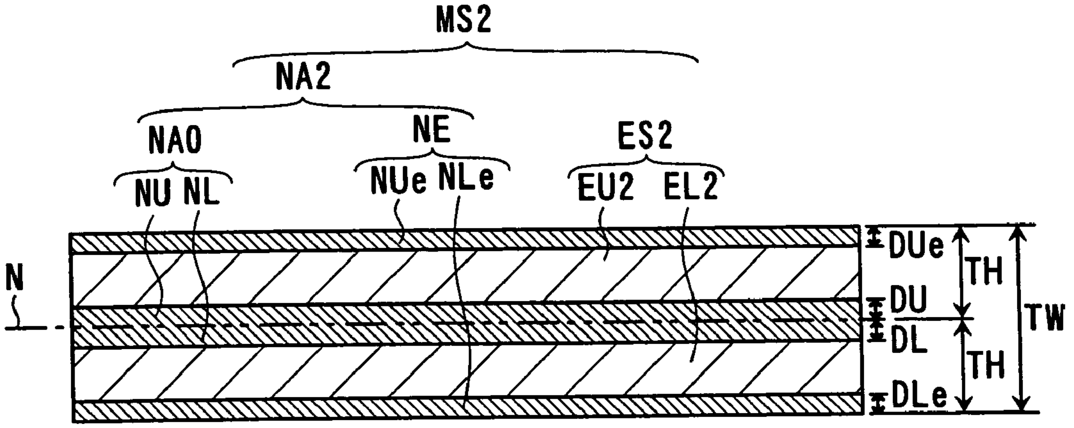
FIG. 10B illustrates a mask image of the example.

To avoid printing in excess of the full width of a tape, margins (width overextension disable areas) may be defined as non-printing areas on both side edges of the tape. As shown in FIG. 10B, the special tape Ts has, in addition to the center non-printing area NA0, an upper printing area EU2, a lower printing area EL2, and edge non-printing areas NE containing an upper non-printing area NUe having a narrow width DUe, and a lower non-printing area NLe having a narrow width DLe.

Figure 10C:
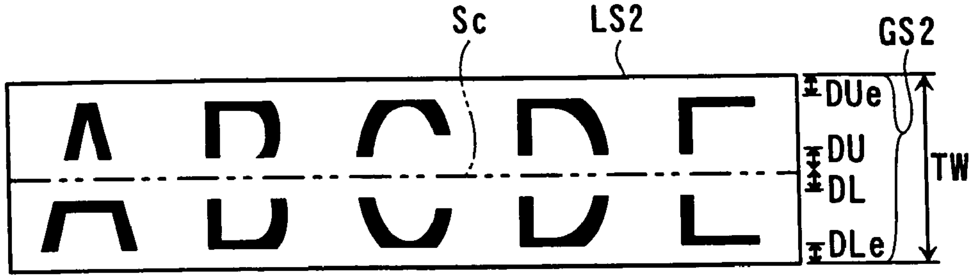
FIG. 10C illustrates a print image and a label produced and printed as a result of AND gating of the basic image and the mask image.

The non-printing area NA2 (=NA0+NE) and a printing area ES2 (=EU2+EL2) are defined. The special tape Ts has the non-printing area NA2. As shown in FIG. 10B, a mask image MS2 having the non-printing area NA2 formed of negative dots is used and AND gated with the basic image G00. As shown in FIG. 10C, the tape printing apparatus 1 easily produces and prints a print image GS2 with the basic image G00 masked by the non-printing area NA2.

As already discussed with reference to FIG. 9B, the leading edge non-printing area NAF (=upper leading edge non-printing area NUF+lower leading edge non-printing area NLF), and the trailing edge non-printing area NAR (=upper trailing edge non-printing area NUR+lower training edge non-printing area NLR) may be defined as a non-printing area in addition to the non-printing area defined in FIG. 10B.

Figure 11A:
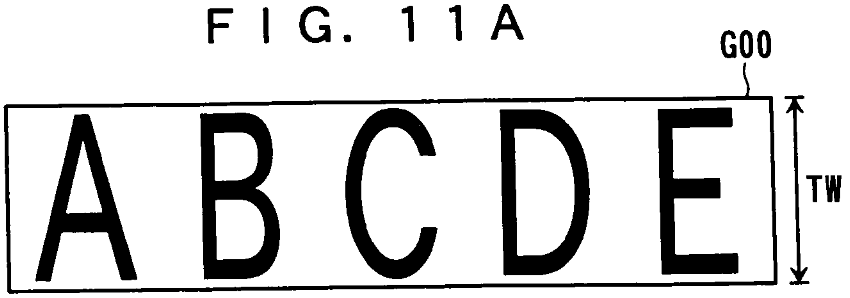
FIG. 11A illustrates a basic image of yet another example.
Figure 11B:
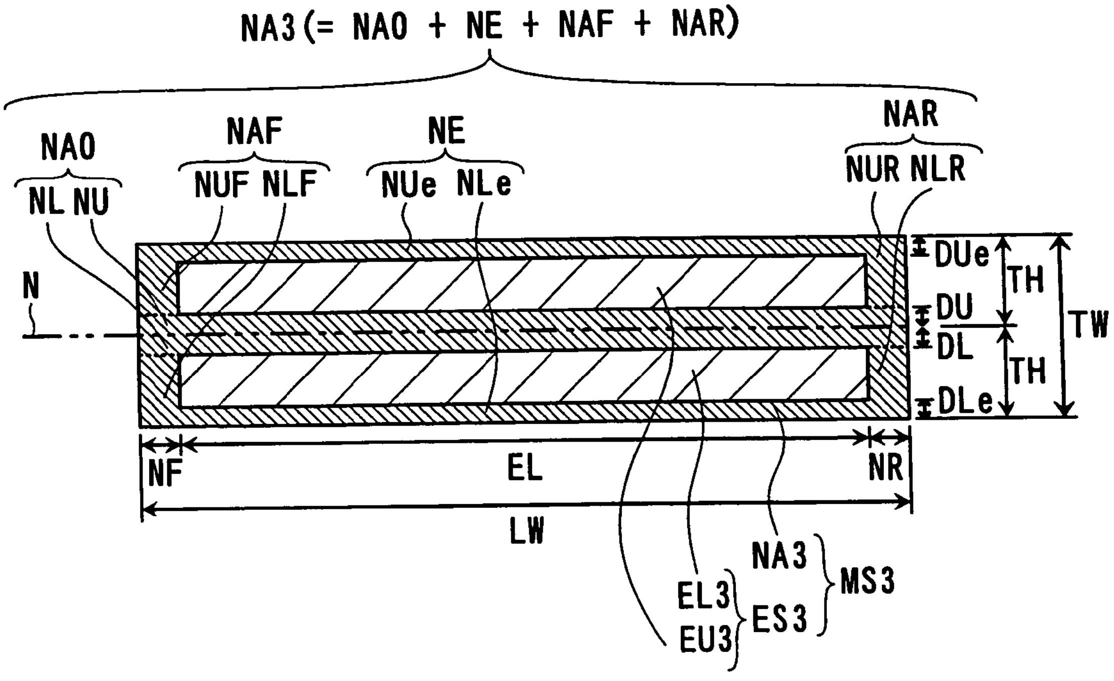
FIG. 11B illustrates a mask image of the example.
Figure 11C:
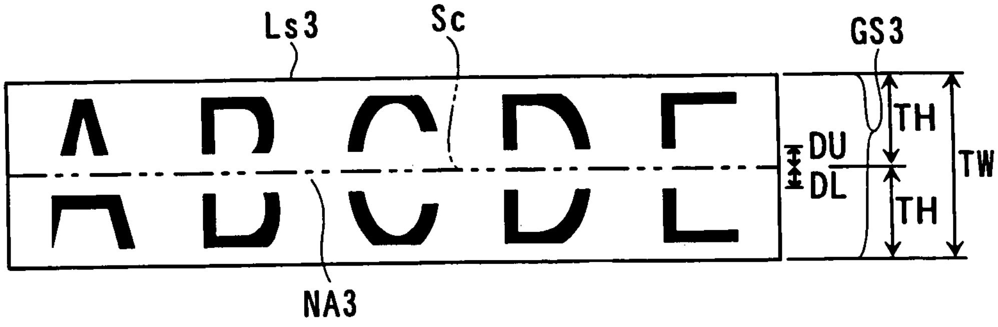
FIG. 11C illustrates a print image on a label produced and printed as a result of AND gating of the basic image and the mask image.

For example, a non-printing area NA3 (=NA0+NE+NAF+NAR), and a printing area ES3 (=EU3+EL3) are defined as shown in FIG. 11B, and the special tape Ts has the non-printing area NA3. As shown in FIG. 11B, a mask image MS3 is prepared and AND gated with the basic image G00. A print image GS3 with the basic image G00 masked by the non-printing area NA3 is easily produced and printed as shown in FIG. 11C.

Figure 12A:
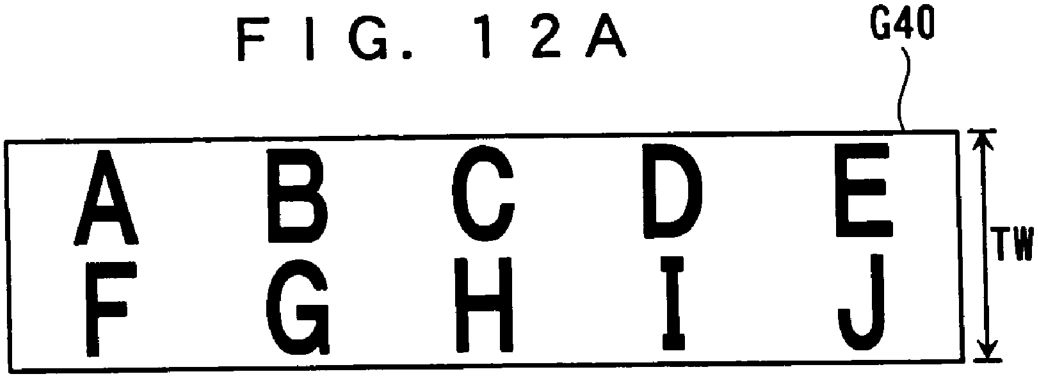
FIGS. 12A-12C illustrate a basic image of two rows.
Figure 12B:
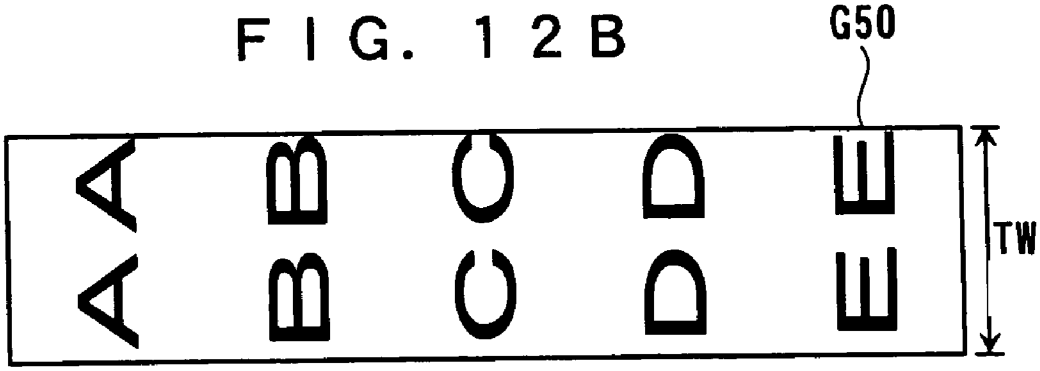
Figure 12C:
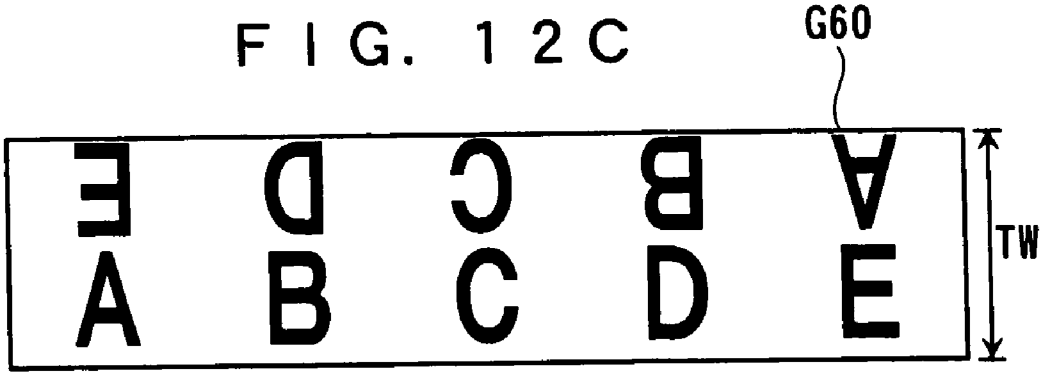

In each of the above examples, the basic image G00 as a single row of character string "ABCDE" is used. As shown in FIGS. 12A-12C, basic images may be a basic image G40 of two rows of character strings, including a first row of "ABCED" and a second row of "FGHIJ", a basic image G50 including two rows of character strings, each character string including "ABCDE" with each character lying on the side thereof, or a basic image G60 of two rows, one lower row including a character string of "ABCDE", and the other upper row including a character string of "ABCDE" in the position thereof rotated by 180 degrees from the first row.

Figure 13A:
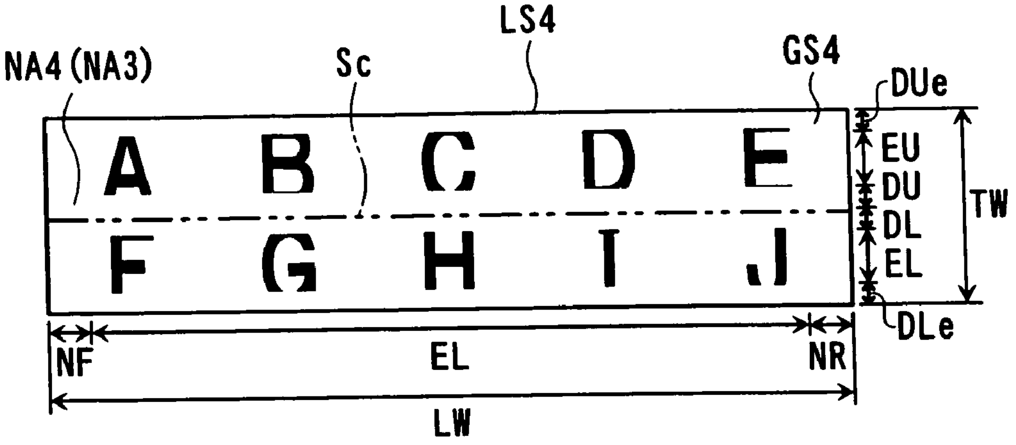
FIGS. 13A-13C illustrate a print image on a label produced and printed as a result of AND gating the mask image of FIG. 11B corresponding to FIGS. 12A-12C.
Figure 13B:
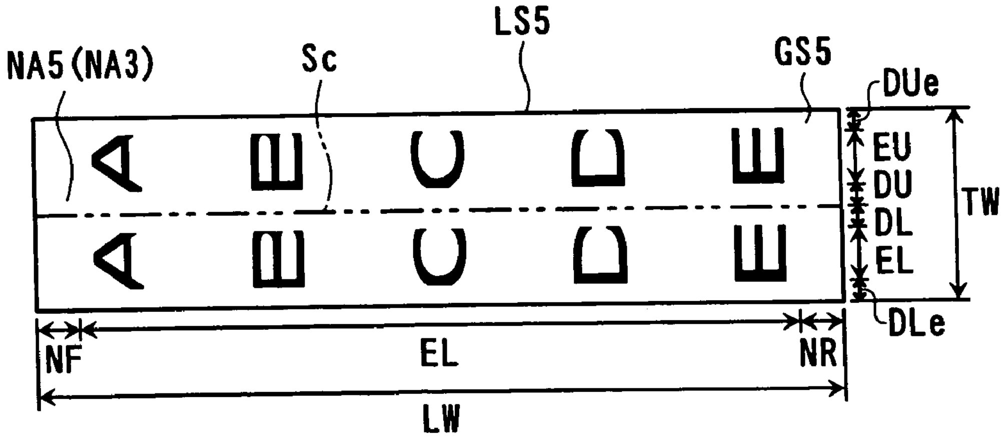
Figure 13C:
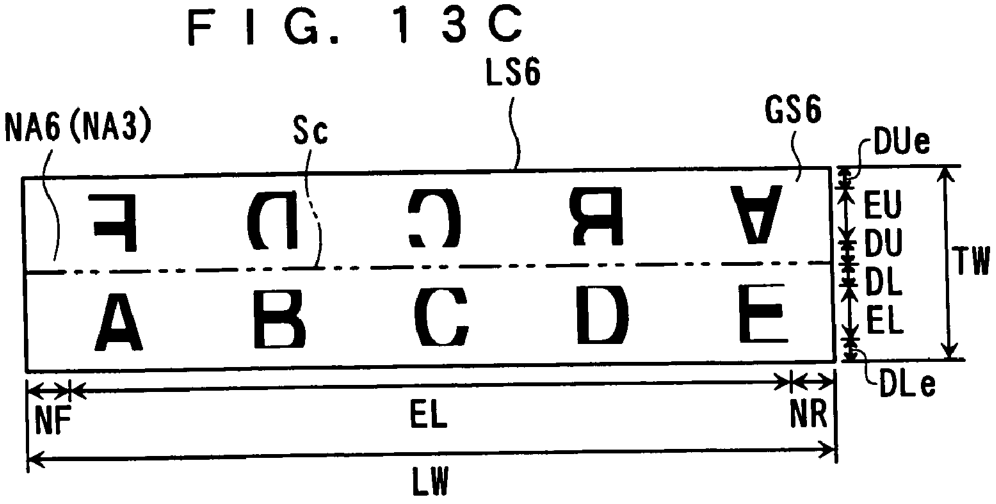

With the special tape Ts having the particular non-printing area NA3 shown in FIG. 11B prepared, the mask data MS3 is AND gated with each of the basic images. As shown in FIGS. 13A-13C, print images GS4, GS5, and GS6 with the basic images G40, G50, and G60 respectively masked by the non-printing areas NA4, NA5, and NA6 (=NA3) are produced and printed.

Figure 14:
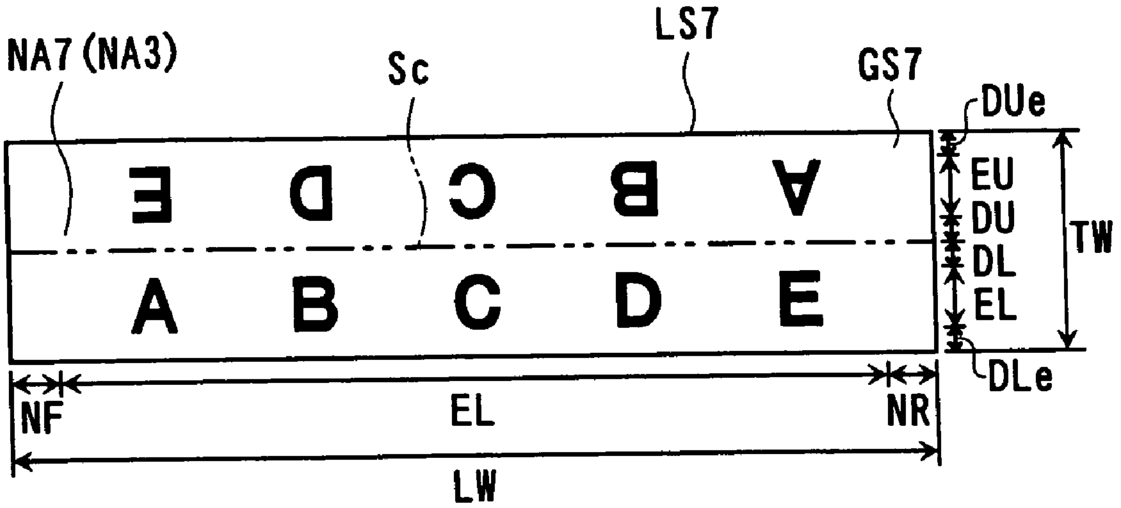
FIG. 14 illustrates a print image on a label printed in a printing area with each row of the basic image contracted corresponding to the image of FIG. 13C.

The basic image may be modified as a print image in accordance with the non-printing area. As shown in FIG. 14, for example, the image of the character string of the basic image G60 of FIG. 12C is reduced in scale in accordance with the print area ES3 of the mask image MS3 of FIG. 11B prepared for the special tape Ts so that no portion of the character string is free from missing resulting from masking by a non-printing area NA7 (=NA3). A print image GS7 is thus produced and printed.

Figure 15:
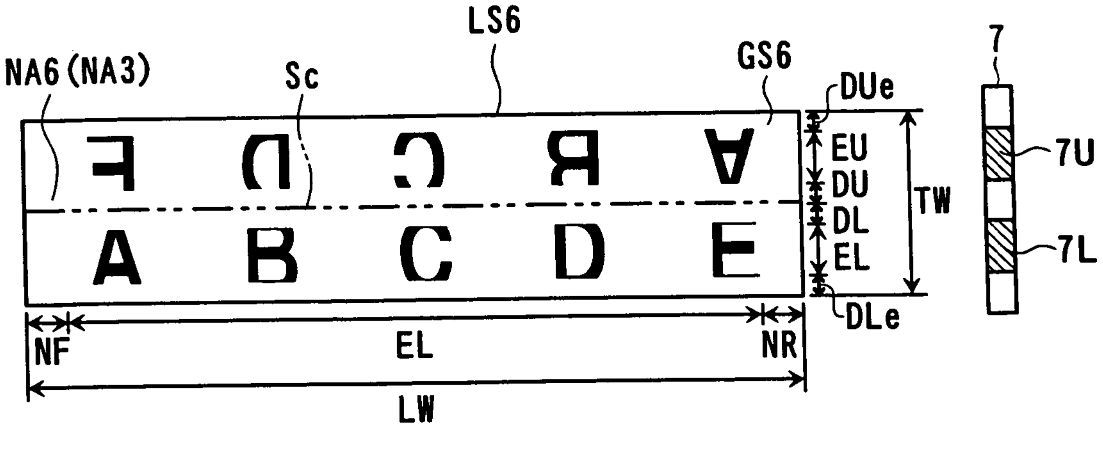
FIG. 15 illustrates a print image that is obtained through drive control of a printer head without using AND gating, the print image identical to the print image of FIG. 13C.

In each of the above examples, the print image is produced and printed by AND gating the mask image. The print image GS 6 shown in FIG. 13C is printed as described below. As shown in FIG. 15, the tape printing apparatus 1, in timing control thereof, drives only thermal elements, out of thermal printing dots of the printer head 7, corresponding to print widths EU and EL of the printing area ES3 (=EU3+EL3) of the mask image MS3 (areas 7U and 7L), and does not drive the thermal elements corresponding to the leading edge non-printing area NAF and the trailing edge non-printing area NAR of FIG. 11B. The tape printing apparatus 1 thus provides the same result as the one shown in FIG. 13C.

When the special tape Ts having the particular non-printing area is detected, the print image matching the non-printing area is printed. If a plurality of tapes T, each having a particular non-printing area, are available, the type of the tape T, rather than the special tape Ts, is detected and the print image matching the non-printing area corresponding to the type is printed. Since the tape printing apparatus 1 detects the type of the tape T, such an application is possible.

The tape printing apparatus 1 detects the type of the loaded tape T from among a plurality of types of tapes T different in non-printing area, and produces and prints the print image with the basic image masked by the non-printing area corresponding to the detected type. The tape printing apparatus 1 thus prints the print image matching the non-printing area on each of the plurality of types of tapes different in non-printing area (including the special tape Ts having the particular non-printing area).

The processing methods (data processing method such as the production method of the print image, the printing method, and the label production method) are applicable as a program for use in each of the tape printing apparatuses. The program may be stored in a storage medium such as CD, MD, DVD, etc. By reading the program from such a storage medium, and executing the program, the print image matching the non-printing area is printed on each of the plurality of types of tapes different in non-printing area (including a special tape having a particular non-printing area). An appropriate modification is possible without departing from the scope of this invention.

The first preferred embodiment of this invention provides the standalone tape printing apparatus. Alternatively, a supply apparatus for supplying image data of a print image may be connected to a similar tape printing apparatus through communication means in a system. Such a separate type printing system is described below as a second preferred embodiment.

Figure 16:
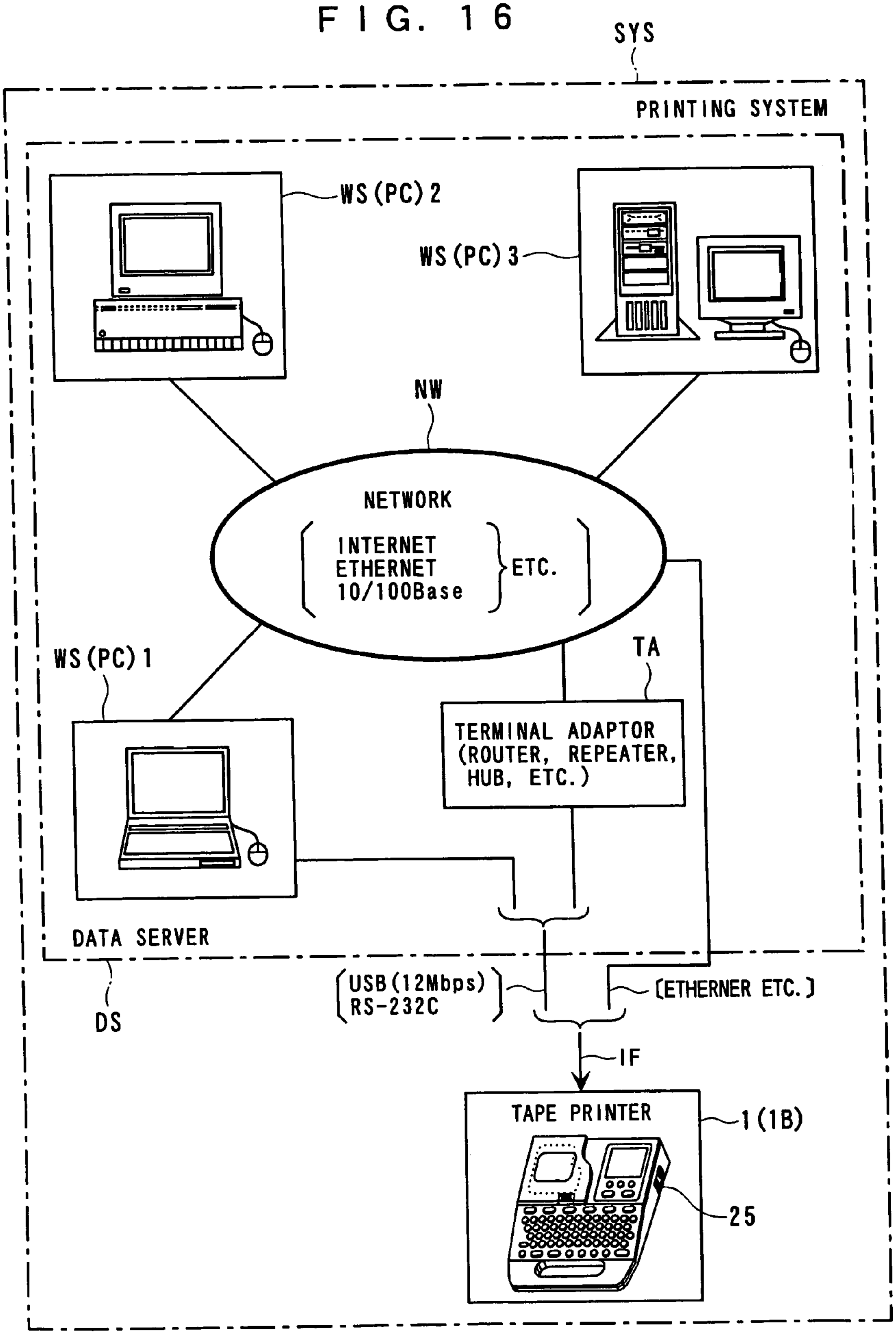
FIG. 16 illustrates a first configuration of a printing system of a second preferred embodiment of this invention.
Figure 17:
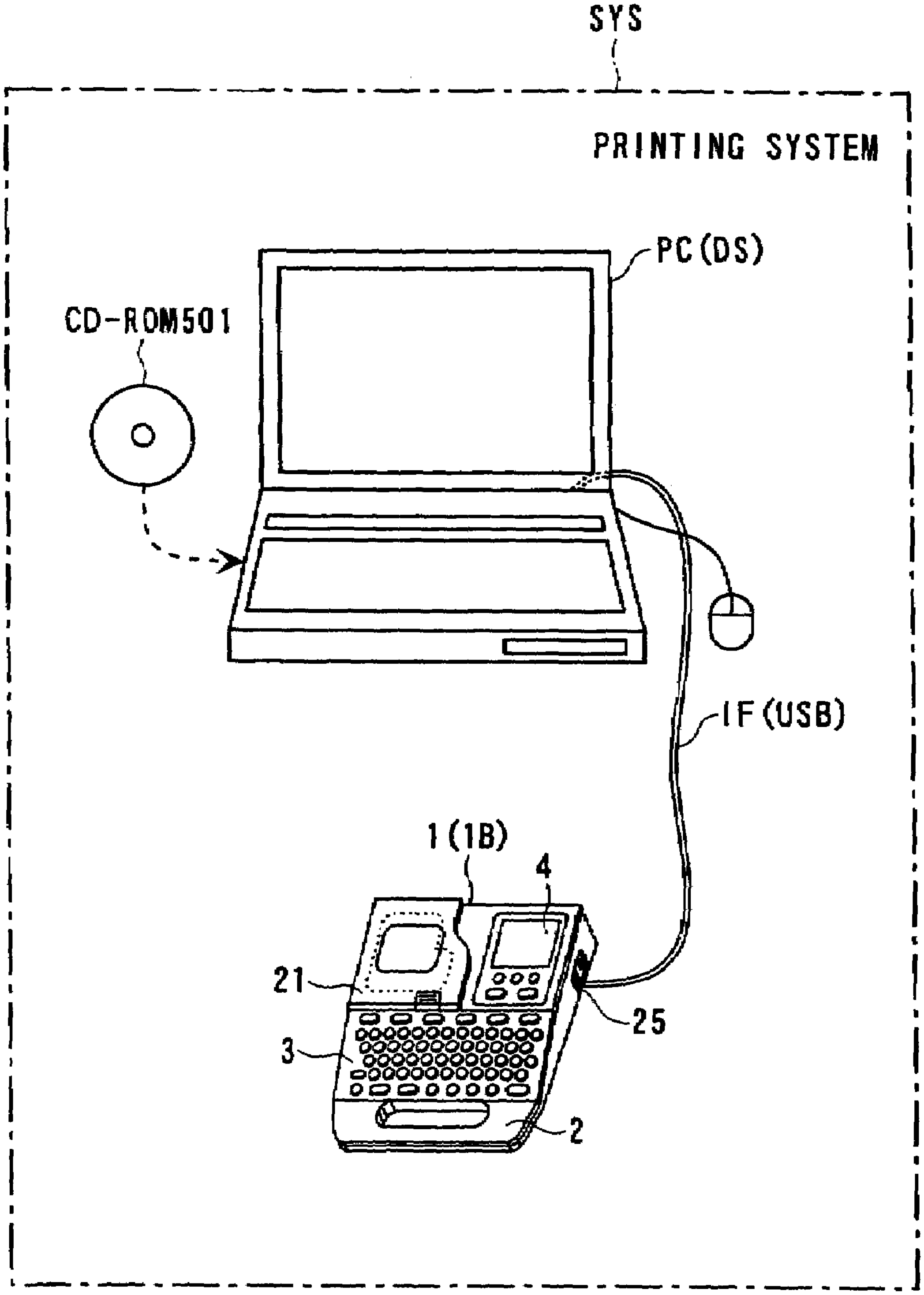
FIG. 17 illustrates a second configuration of the printing system of FIG. 16.

Referring to FIGS. 16 and 17, a printing system SYS includes a tape printing apparatus 1 of the second preferred embodiment of this invention and a data server (supply apparatus) DS connected to the tape printing apparatus 1 through an interface IF. To discriminate the tape printing apparatuses of the first and second preferred embodiments, the tape printing apparatus 1A is the one for the first preferred embodiment, and the tape printing apparatus 1B is the one for the second preferred embodiment in the discussion that follows.

As shown in FIG. 16, the data server DS includes a network NW at the center, a plurality of workstations WS (such as PCs) serving as terminals, and terminal adaptors (routers, repeaters, and hubs). The tape printing apparatus 1 may be connected to the network NW through the interface IF and any terminal, or may be directly connected to the network NW through an interface IF. The network NW meets IEEE standard LAN protocol, and may be the internet, or one of a variety of local area networks (such as Ethernet®, or 10/100 Base). The interface IF connected to the terminal may be a serial data communication interface (such as RS-232C, USB, IEEE1394), or parallel data communication interface (such as Centronics). These are wired communication standards. Alternatively, wireless communication interface may be used.

The data server DS may be a standalone device. As shown in FIG. 17, the printing system SYS is constructed by connecting a standalone PC to the tape printing apparatus 1B through the interface IF such as USB. In accordance with a first configuration of FIG. 16, print image data stored in the data server DS (WS1-3, or TA) is supplied to the tape printing apparatus 1B by downloading. In a second configuration of FIG. 17, print image data stored in a personal computer PC (such as DS) is supplied to the tape printing apparatus 1B for printing.

Figure 18:
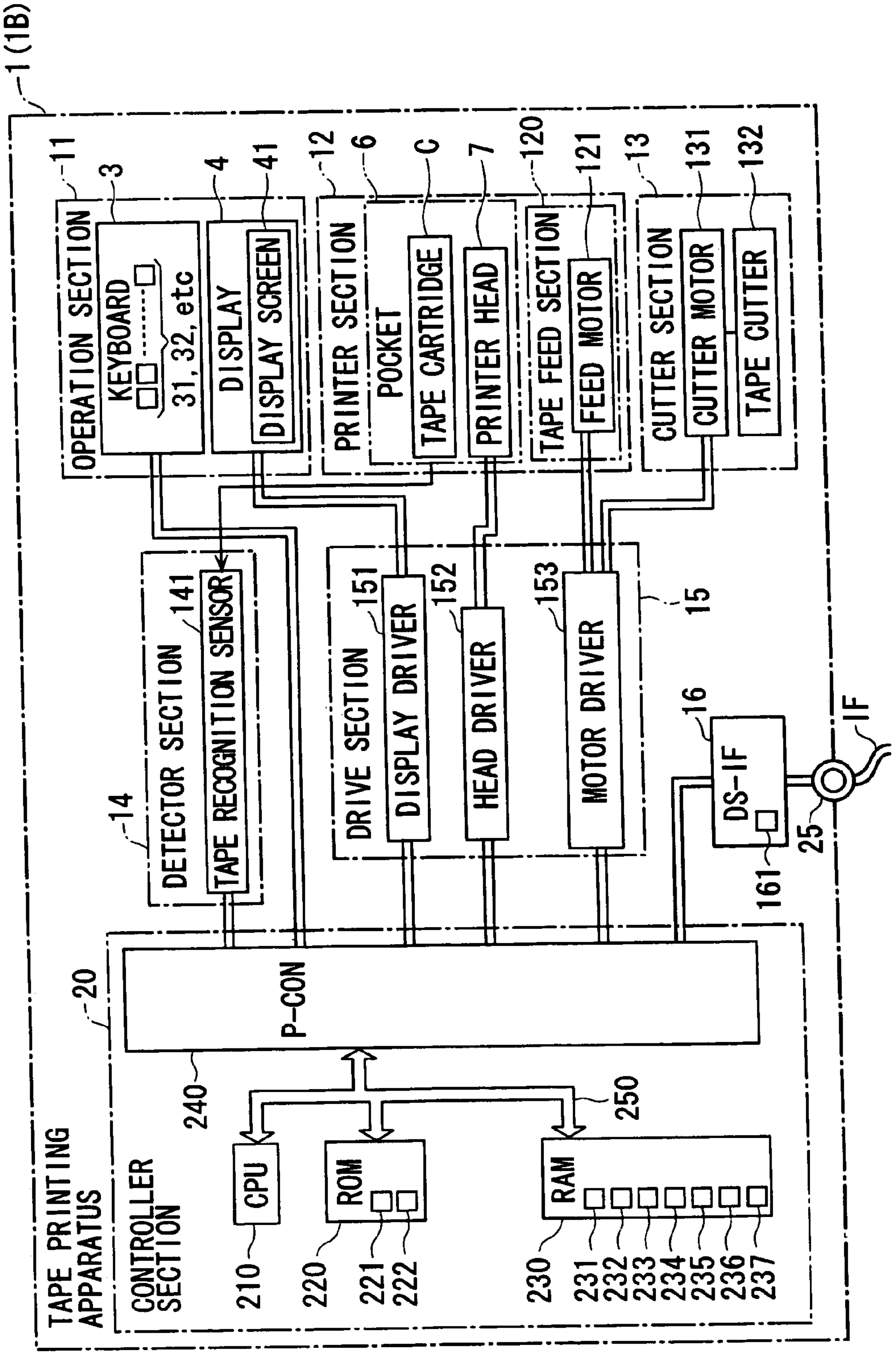
FIG. 18 is a block diagram illustrating the control system of the tape printing apparatus of the first and second configurations of FIGS. 16 and 17.

The printing system SYS of the second configuration of FIG. 17 will now be discussed. As shown in FIG. 18, the tape printing apparatus 1B includes a data supply interface (DS-IF) 16 in addition to the tape printing apparatus 1A of FIG. 3 of the first preferred embodiment of this invention. The DS-IF 16 communicates with the data server DS through the USB cable interface IF and a USB connector 25 in accordance with the USB protocol.

The DS-IF 16 includes a receiver buffer 161 for receiving variety of data (print image data) from the data server DS. The P-CON 240 receives detected signal from the detector section 14 and commands and input data from the keyboard 3. Furthermore, the P-CON 240, connected to the DS-IF 16, captures, from the data server DS, controls signals and downloaded data directly or in the modified form thereof into the internal bus 250. In cooperation with the CPU 210, the P-CON 240 outputs, data and control signals output to the internal bus 250, to the drive section 15 or the DS-IF 16 directly or in the modified form.

Figure 5B:
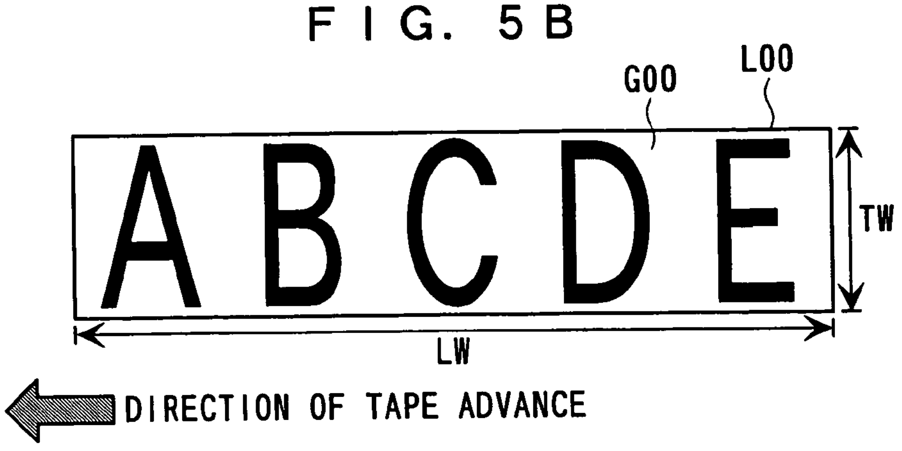
FIG. 5B illustrates the result of printing.

When tape longitudinal printing is performed, the data server DS having the second configuration of FIG. 17 displays a text editing screen identical to the text editing screen D10 of the character string of "ABCDE" of FIG. 5. When a user selects a print command key with the basic image G00 presented on a display screen, the data server DS displays a message "printing in progress" while transmitting, through the interface IF, the print image data of the basic image G00 of the character string of "ABCDE", and cut command data commanding the type and timing of cut (the tape is cut at the trailing edge in the tape advance direction shown in FIG. 5B).

The tape printing apparatus 1B receives the print image data of the basic image G00 and the cut command signal through the DS-IF 16 while printing the basic image G00. The tape printing apparatus 1B cuts at the trailing edge, thereby producing a label L00.

As the standalone tape printing apparatus 1A of the first preferred embodiment, the printing system SYS also prints the print image GS0 matching the non-printing area NA0 on the special tape Ts having the particular non-printing area NA0 as shown in FIG. 8B. The tape printing apparatus 1B is free from distortion due to heating and ink smearing on the tapes as shown in FIG. 9A through FIG. 13C.

Since the tape printing apparatus 1B detects the type of the tape accounting for the tape width thereof using the tape recognition sensor 141, the result of detection is reported to the data server DS through the interface IF. The data server DS prepares beforehand (stores) the mask image MS0, and AND gates the mask image MS0 with the basic image G00, thereby producing the print image GS0 and supplying the tape printing apparatus 1B with the print image GS0.

The tape printing apparatus 1 reports to the data server DS the type of the loaded tape T (more specifically, the type of the tape cartridge C) after determining whether the loaded tape is a special tape Ts. Alternatively, the tape printing apparatus 1 simply reports to the data server DS the information of the type of the loaded tape T and the type of the tape cartridge C, and leaves to the data server DS the determination of whether the loaded tape T is a special tape Ts. The information reporting may be performed each time a new tape cartridge C is loaded on the tape printing apparatus 1 so that the data server DS holds the information. In time of need, the data server DS requests the tape printing apparatus 1 to send information, and the tape printing apparatus 1 sends the information in response.

In the printing system SYS of the second preferred embodiment of this invention, the tape printing apparatus 1 detects the loading of the special tape Ts, and reports to the information about the special tape Ts to the data server DS. Upon receiving the reporting of the loading of the special tape Ts, the data server DS produces a modified image with the basic image G00 masked by the non-printing area NA0, and supplies the tape printing apparatus 1 with the modified image as the print image GS0. The tape printing apparatus 1 prints the print image GS0. The tape printing apparatus 1 thus prints the print image GS0 matching the non-printing area NA0 on the special tape Ts having the particular non-printing area NA0 in addition to the area common to all tapes T.

The printing system SYS of the second preferred embodiment of this invention may store specification information of the mask image MS0 only, and may produce the mask image MS0 when the special tape Ts is detected. The data server DS supplies the tape printing apparatus 1 with the basic image G00 as an original print image, and the tape printing apparatus 1 prepares the mask image MS0, produces the print image GS0 by AND gating the mask image MS0 and the supplied the basic image G00, and prints the print image GS0.

Image production data (including text data, element image data, etc.) may be directly transmitted from the data server DS to the tape printing apparatus 1 through the interface IF to produce the basic image G00. The tape printing apparatus 1 may produce the basic image G00, the print image GS0, and the label. The data may be transmitted to the tape printing apparatus 1 in any form, selected from the form of the image production data, the form of the basic image G00, and the form of the print image GS0, for example.

As in the standalone tape printing apparatus 1A, the tape printing apparatus 1B may also modify the basic image G60 (see FIG. 12C) if the basic image G60 is reduced in scale so that the non-printing area NA7 (=NA3 as shown in FIG. 14) is free from partial overlapping (from partial missing). Instead of producing the print image GS6 (see FIG. 13C) from the basic image G60 (see FIG. 12C) through AND gating, the tape printing apparatus 1A may control the printer head 7 in response to the basic image G60 and the non-printing area NA6 (=NA3), thereby resulting in the print image GS6 in print (see FIG. 15).

If a plurality of tapes T, each tape having a particular non-printing area, are available, the type of the tape T, rather than the special tape Ts, is detected and the print image matching the non-printing area corresponding to the type is printed. The tape printing apparatus 1B thus prints the print image matching the non-printing area on each of the plurality of types of tapes different in non-printing area (including the special tape having the particular non-printing area).

In the second preferred embodiment of this invention, the data server DS stores the basic image G00 and the mask image MS0. In this case, the data server DS may produce the basic image G00 and the mask image MS0. As shown in FIG. 17, the basic image G00 and the mask image MS0, already produced, are supplied from a compact disk (CD or CD-ROM) 501. Simply replacing the CD-ROM 501, a variety of basic image G00 and mask image MS0 are prepared, or the basic image G00 and the mask image MS0 are modified depending on applications.

The control program (dedicated application program) for performing various processes may be stored in the data server DS. Alternatively, the control program may be stored solely or together with a file containing the basic image G00 and the mask image MS0 in the CD-ROM 501, and initiated by downloading. If the control program is set to be an application program executable on an typically available operation system (OS), the control program can be executed by simply loading the CD-ROM 501 on a personal computer having the OS installed thereon.

Instead of the CD-ROM, other storage medium, such as a floppy disk (FD), a magneto-optical disk (MO), or a digital versatile disk (DVD) may be used. In the network NW of FIG. 16, instead of the network of FIG. 17, a variety of files and programs are received from other apparatuses (such as WS 2 or WS 3 as shown) connected to the network NW through the network NW or through an apparatus (such as PC 1 or TA as shown) directly connected to the tape printing apparatus 1. After receiving the files and programs, the tape printing apparatus 1 stores or modifies the files and programs. The programs on the data server DS side may include a program which is to be downloaded and used by the tape printing apparatus 1.

In accordance with the second preferred embodiment of this invention, the tape printing apparatus 1B includes the operation section 11 having the keyboard 3 and the display 4. If the tape printing apparatus 1B performs all or most of the operation thereof in response to commands from the data server DS, the operation section 11 is not required on the tape printing apparatus 1B. The operation section 11 may be eliminated from the tape printing apparatus 1B.

A printing system SYS of a third preferred embodiment of this invention includes a tape printing apparatus 1C of FIGS.

19 and 20, which is different from the tape printing apparatus 1B (shown in FIGS. 17 and 18) in that the tape printing apparatus 1C is without the operation section 11.

The processing methods (data processing method such as the production method of the print image, the printing method, and the label production method) in accordance with the second and third preferred embodiments of this invention are applicable as a program for use in each of the printing systems. The program may be stored in the previously described storage media. By reading the program from such a storage medium, and executing the program, the print image matching the non-printing area is printed on each of the plurality of types of tapes different in non-printing area (including a special tape having a particular non-printing area) even in a separate type tape printing apparatus. An appropriate modification is possible without departing from the scope of this invention.

Modifications of the first through third preferred embodiments of this invention will now be discussed.

Modifications of the standalone printing apparatus 1A of the first preferred embodiment of this invention are described below.

In each of the previously discussed preferred embodiments, the loading of the special tape Ts and the type of the loaded tape T are automatically detected. Alternatively, the user may manually enter setting for the loading of the special tape Ts and the type of the loaded tape T watching the loaded tape.

When the loading of the special tape Ts is set, for example, the basic image G00 is masked by the non-printing area NA0 particular to the special tape Ts to produce the print image GS0. The print image matching the non-printing area NA0 is thus printed on the special tape Ts having the non-printing area NA0.

Similarly, when one of a plurality of tapes T having non-printing areas particular thereto is set, the print image is produced and printed with the basic data masked by the non-printing area corresponding to the type. The print image matching the non-printing area is thus printed on each of the plurality of tapes having different non-printing areas (including the special tape Ts having the particular non-printing area).

The basic image G00 in the text data thereof is edited on the text editing screen D10 of FIG. 5A, and is expanded in an image in response to a print command. The basic image G00 is then masked by the mask image MS0 of FIG. 8B. If the non-printing areas NA1-NA3 are relatively complex in shape in the mask images MS1-MS3 shown in FIGS. 9B-11B, the basic image is edited viewing the shape of the print image.

If a relatively large size display screen large enough to recognize the non-printing area is used, the tape printing apparatus 1 having such a display screen may edit the basic image on the image display screen.

When the loading of the special tape Ts is detected or set, the image of the external shape (printable area) of the special tape Ts and non-printing areas NA1-NA3 (hereinafter represented by the non-printing area NA3 in FIG. 11B) is shown on the display screen. The user edits the basic image (such as the basic image G60 of FIG. 12C) serving as a source of the print image (such as the GS6 of FIG. 13C) falling within the external shape of the tape T on the display screen. The user thus easily produces the basic image G60 serving as the source of the print image GS6 while viewing the non-printing area NA6 (NA3) of the special tape Ts.

Similarly, when one loaded tape of the plurality of tapes T, each tape having the respective particular non-printing area, is detected or set, the image of the shape of the loaded tape T (with the width thereof different depending on type, for example) and the non-printing area NA3 is shown on the display screen. The basic image G60 serving as a source of the print image GS6 is edited within the external shape of the tape T on the display screen. The user thus easily produces the basic image G60 serving as the source of the print image GS6 while viewing the non-printing area NA3 corresponding to the type of the tape T.

When a relatively large display screen is available as described above, the print image may be directly edited on the display screen together with the basic image (or instead of the basic image).

For example, when the loading of the special tape Ts is detected or set, the image of the external shape of the special tape Ts and the non-printing area NA3 is shown on the display screen. The print image is edited so that the print image falls within the external shape of the tape and within the printing area ES3 (except the non-printing area) on the display screen. The user thus produces and prints the print image, such as GS7, so that the print image is kept out of the non-printing area NA7 (=NA3) as shown in FIG. 14 while viewing the non-printing area NA3 of the special tape Ts.

When one loaded tape from among the plurality of types of tapes T is detected and set, the image of the shape of the tape T and the non-printing area NA3 is displayed on the display screen. The print image is edited so that the print image falls within the external shape of the tape T and the printing area ES3 on the display screen. The user thus produces and prints the print image GS7 so that the print image is kept out of the non-printing area NA3 while viewing the non-printing area NA3 of the loaded tape T.

In the foregoing discussion, the type of each of the special tapes Ts and other tapes T corresponds to the respective non-printing area. Alternatively, the type of the tapes Ts and T may not directly correspond to the non-printing area. In such a case, non-printing area information (such as mask image data MS0-MS3 or the non-printing area data NA0-NA3, or specification information of these pieces of data) indicating a plurality of mutually different types of non-printing areas (such as non-printing areas NA0-NA3) is stored regardless of the type of the loaded tape T.

Similarly, in such a case, the basic image, such as G60 (see FIG. 12C), serving as the source of the print image, such as GS6, is stored. One of the non-printing areas (for example, NA3) is selected. Based on the selected non-printing area, the basic data G60 is masked to produce and print the print image GS6. The print image GS6 matching the non-printing area NA3 is printed with each of the non-printing areas NA0-NA3 set on each of the tapes T (including the special tape Ts having the particular non-printing area).

When a relatively large display screen is available, an image of the external shape of the tape T and the non-printing area, such as NA6 (=NA3), is displayed on the display screen with the type of the tape T detected or set. The basic image, such as G60, serving as the source of the print image, GS6, is edited to within the external shape of the tape T on the display screen. The user easily produces the basic image G60 serving as the print image GS6 while viewing the type of the tape T and the applied (set) non-printing area NA3.

In this case as well, the print image may be directly edited using a relatively large display screen. More specifically, a plurality of different types of non-printing areas (such as the non-printing areas NA0-NA3) are stored. One of the non-printing areas (NA3, for example) is selected. The loaded tape T is detected or set. The image of the external shape of the tape T and the non-printing area NA7 (=NA3) is displayed on the display screen. The print image is thus edited so that the print image falls within the external shape of the tape T and within the printing area ES3 on the display screen. The user thus easily produces and prints the print image GS7 so that the print image is kept out of the non-printing area NA7 (=NA3) as shown in FIG. 14 while viewing the type of the tape T and the applied (set) non-printing area NA3.

Each of the above referenced processes is applicable as a program to be processed by each tape printing apparatus. The program may be stored in the previously described storage media. By reading the program from such a storage medium, and executing the program, the print image matching the non-printing area is printed on each of the plurality of types different in non-printing area (including a special tape having a particular non-printing area) even in a separate type. An appropriate modification is possible without departing from the scope of this invention.

Modifications of the separate type tape printing apparatus 1 of the second and third preferred embodiments of this invention are described below.

In the separate type printing system SYS, the loading of the special tape Ts and the type of the loaded tape T are automatically detected. Alternatively, recognizing the loaded tape T, the user may manually enter setting for the loading of the special tape Ts and the type of the loaded tape T. In this case, however, the type of the tape T may be set on either side, may be set on the data server DS side, or may be set on the tape printing apparatus 1B or 1C.

When the setting that the tape T (already loaded or to be loaded) is a special tape Ts is input using a keyboard operation or a screen operation on the data server DS, modified image data is produced by masking the basic image G60 in accordance with the non-printing area information indicating the non-printing area NA3 of the special tape Ts. The data server DS supplies the tape printing apparatus 1 with the modified image data as the print image. The tape printing apparatus 1 produces the print image GS6 based on the print image. The print image GS6 matching the non-printing area NA3 is thus printed on the special tape Ts having the particular non-printing area NA3.

In this case, the type of the set tape T does not necessarily match the type of the tape actually loaded on the tape printing apparatus 1. For example, before loading the tape T of the type matching the setting on the tape printing apparatus 1 (for example, before getting a desired tape T), various processes (including the editing operation of the basic image serving as the source of the print image) may be tentatively performed on the data server DS taking into consideration the type of the set tape T before the desired tape is available.

As previously discussed, the tape printing apparatus 1 detects the type of the tape T using the tape recognition sensor 141, and reports to the data server DS the type of the tape T. The data server DS thus checks that the detected tape T is the special tape Ts, namely, determines whether the setting coincides with the detected result. If it is determined that the setting fails to coincide with the detected result, the data server DS learns no coincidence.

Similarly, one of the plurality of types of tapes, each tape having the respective particular non-printing area, is loaded on the tape printing apparatus 1, and the data server DS sets any of the types of tapes. The modified image data is produced with the basic image G60 masked by the non-printing area NA3, and is then transmitted to the tape printing apparatus 1 as the print image. The print image GS6 is thus printed. The print image GS6 matching the non-printing area NA3 is thus printed on each of the plurality of tapes T different in non-printing area (including the special tape Ts having the respective particular non-printing area).

In this case as well, the tape printing apparatus 1 detects the type of the tape T using the tape recognition sensor 141, and reports to the data server DS the type of the tape T. The data server DS determines whether the setting coincides with the detected result. If it is determined that the setting fails to coincide with the detected result, the data server DS learns no coincidence.

The tape printing apparatus 1 not only detects the type of the tape T but also inputs the setting that the special tape Ts is loaded (regardless of whether the special tape Ts has been actually loaded). The tape printing apparatus 1 reports to the data server DS the setting result.

Based on the non-printing area information indicating the non-printing area, such as NA3, of the special tape Ts, the data server DS masks the basic image G60, produces the modified data, and supplies the tape printing apparatus 1 with the modified data. The tape printing apparatus 1 prints the print image GS6. The print image GS6 matching the non-printing area NA3 is thus printed on the special tape Ts having the particular non-printing area NA3.

In this case as well, the type of the actual tape T may be different from the setting. For example, before loading (getting) the tape T of the type matching the setting, various processes may be tentatively performed on the data server DS taking into consideration the type of the set and reported tape T.

The tape printing apparatus 1 sets one of the plurality of types of tapes T, each tape having the respective particular non-printing area, and reports to the data server DS the set tape T. The data server DS masks the basic image G60, and supplies the tape printing apparatus 1 with the masked basic image G60, and the tape printing apparatus 1 prints the basic image GS6. The print image GS6 matching the non-printing area NA3 is thus printed on each of the plurality of types of tapes T different in non-printing area (including the special tape Ts having the particular non-printing area). If the set and reported tape T is different from the type of the actual tape T, the same process as previously described is performed.

Figure 19:
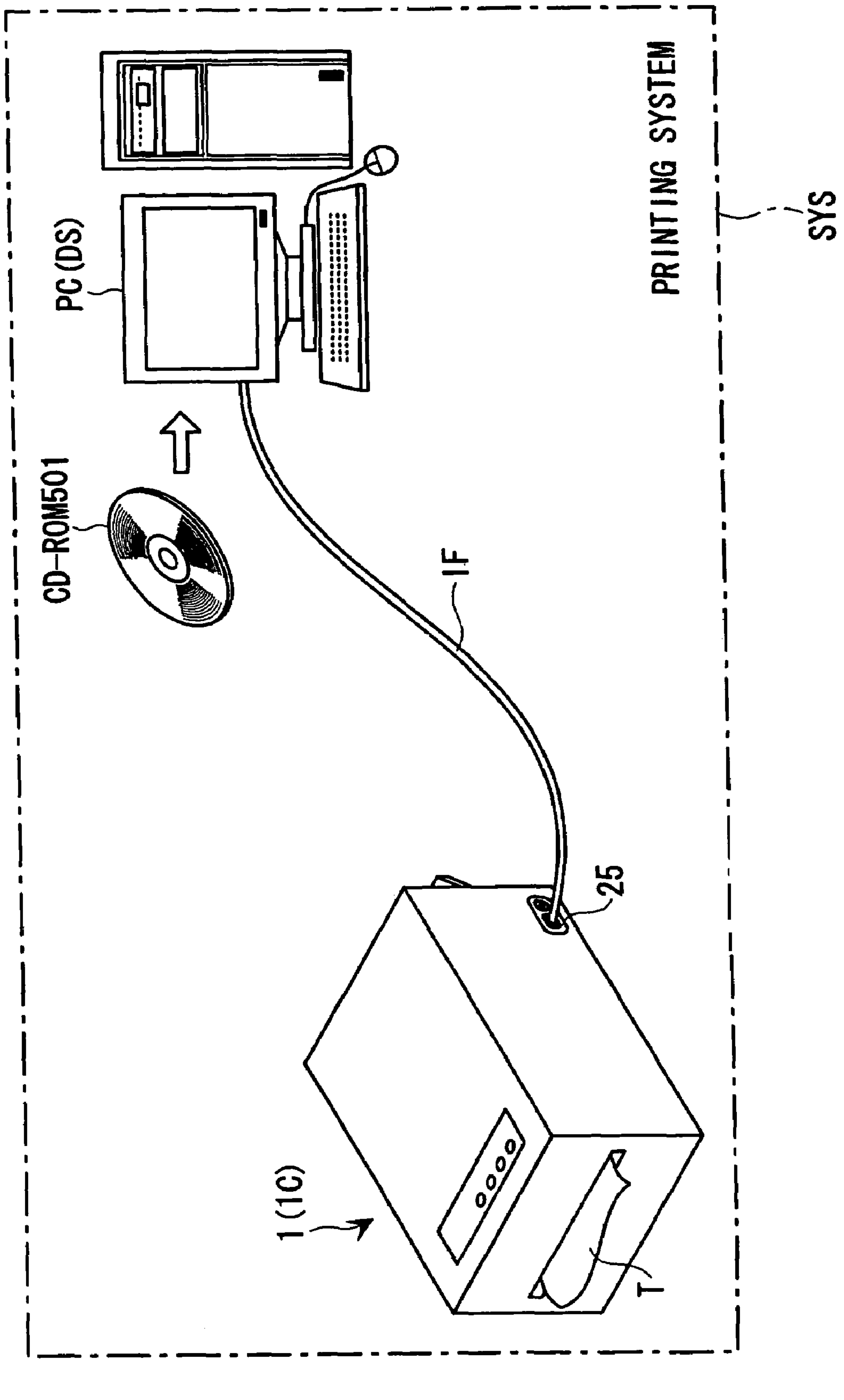
FIG. 19 illustrates a third configuration of the printing system of FIG. 16.
Figure 20:
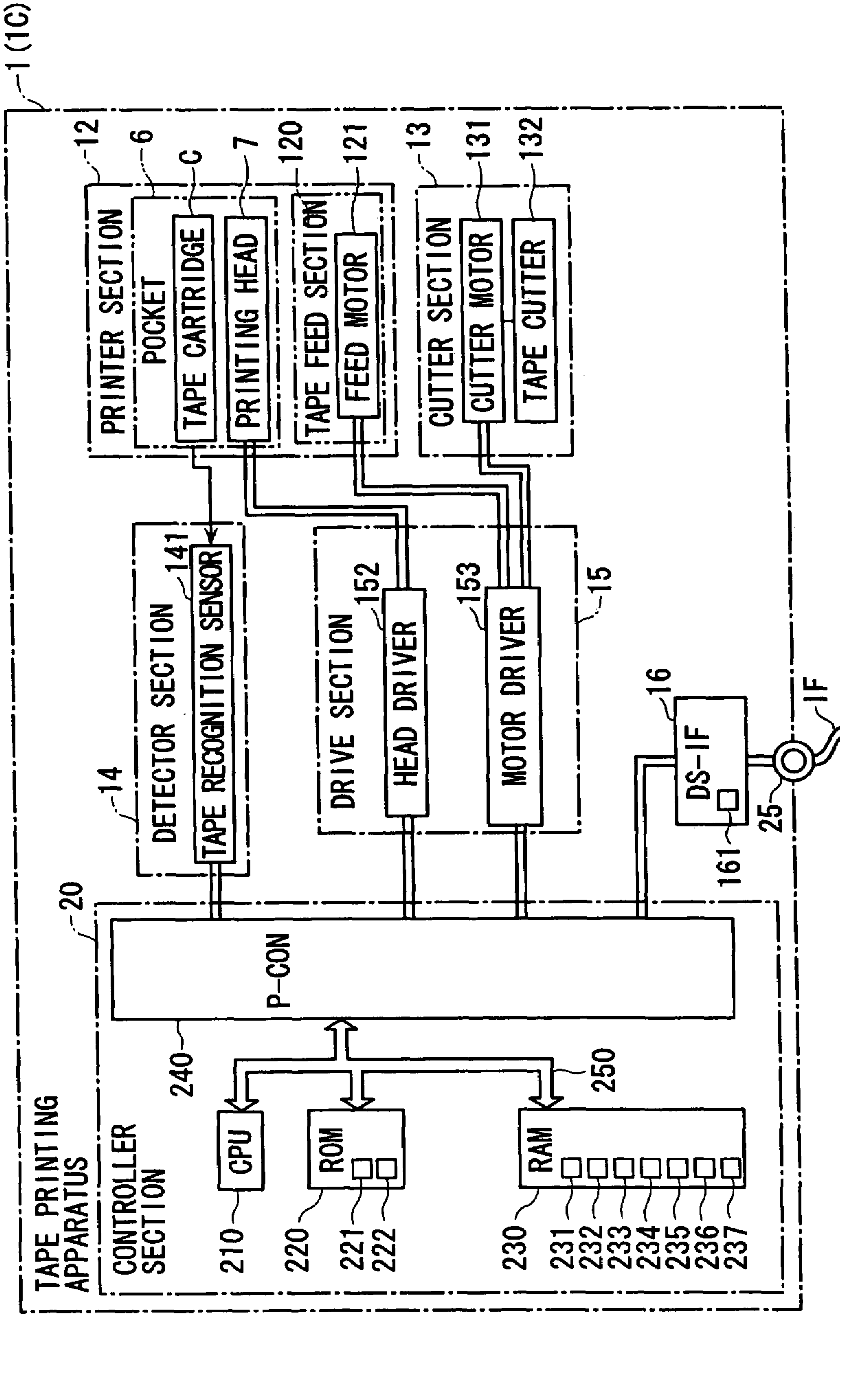
FIG. 20 is a block diagram of the control system of the tape printing apparatus in accordance with the third configuration of FIG. 19.

In the case of the relatively complex mask images MS1-MS3 including the non-printing areas NA1-NA3 shown in FIGS. 9B, 10B, and 11B, the user may desire to edit the basic image while viewing the shape of the images. In the separate type printing system SYS, the display screen of the PC is used as the display screen of the data server DS. A large size display screen is more easily available as shown in FIGS. 16, 17, and 19 than in the standalone tape printing apparatus 1A. In the printing system SYS having such a large display screen, the basic image is easy to edit on the display screen.

When the loading of the special tape Ts is detected or set, the special tape Ts is loaded on the tape printing apparatus 1. The data server DS displays the image of the external shape of the special tape Ts and the non-printing area, such as NA3, on the display screen thereof. The basic image G60 serving as the source of the print image GS6 is edited within the external shape of the tape T on the display screen. The user thus easily produces the basic image G60 serving as the source of the print image GS6 while viewing the non-printing area NA6 (=NA3) of the special tape Ts.

When one of the plurality of tapes T, each tape having the respective non-printing area, loaded on the tape printing apparatus 1 is detected or set, or when the type of the tape T is set in the data server DS, the data server DS displays the image of the shape of the tape T (different in width depending on the type) and the non-printing area NA3 on the display screen thereof. The basic image G60 serving as the source of the print image GS6 is edited within the external shape of the tape T. The user thus easily produces the basic image G60 serving the source of the print image GS6 while viewing the non-printing area NA3 corresponding to the type of the tape T.

In the printing system SYS having a relatively large display screen, the user may directly edit the print image in addition to the basic image (or instead of the basic image) on the display screen.

When the loading of the special tape Ts is detected or set, the data server DS displays an image of the external shape of the special tape Ts and the non-printing area NA3 on the display screen. The user thus produces the modified image data by editing the basic image serving as the source of the print image so that the basic image falls within the external shape of the tape and the printing area (an area other than the non-printing area) on the display screen. The user thus edits the basic image so that the basic image is kept out of the non-printing area NA7 (=NA3) of FIG. 14 while viewing the non-printing area NA3 of the special tape Ts. The data server DS supplies the tape printing apparatus 1 with the edited image as print image GS7. The print image GS7 is thus easily produced and printed in a manner such that the print image is kept out of the non-printing area NA7 of the special tape Ts.

With one from among the plurality of types of tapes T loaded, the type of that tape T is detected or set. The data server DS displays the image of the shape of the tape T and the non-printing area NA3 on the display screen. The modified image is produced by editing the basic image serving as the source of the print image so that the basic image falls within the external shape of the tape T and the printing area ES3 on the display screen. The user thus edits the basic image so that the basic image is kept out of the non-printing area NA3 on the display screen while viewing the non-printing area NA3 of the tape T. The data server DS supplies the tape printing apparatus 1 with the edited result as the print image GS7 for printing.

Even in the printing system SYS, the type of the tapes Ts and T may not directly correspond to the non-printing area. In such a case, the data server DS stores non-printing area information (such as mask image data MS0-MS3 or the non-printing area data NA0-NA3, or specification information of these pieces of data) indicating a plurality of mutually different types of non-printing areas (such as non-printing areas NA0-NA3) regardless of the type of the tape T loaded in the tape printing apparatus 1.

Similarly, in such a case, the basic image, such as G60, serving as the source of the print image, such as GS6, is stored in the data server DS. One of the non-printing areas (for example, NA3) is selected. Based on the selected non-printing area, the basic data G60 is masked to produce the modified image data. The modified image data is supplied to the tape printing apparatus 1 as the print image. The tape printing apparatus 1 prints the print image based on the print image data. The print image GS6 matching the non-printing area NA3 is thus printed with each of the non-printing areas NA0-NA3 set on each of the tapes T (including the special tape Ts having the particular non-printing area).

Since a relatively large display screen is available on the data server DS, an image of the external shape of the tape T and the selected non-printing area, such as NA3, is displayed on the display screen. The basic image serving as the source of the print image is edited to within the external shape of the tape T on the display screen. The user easily produces the basic image G60 serving as the print image GS6 while viewing the type of the tape T and the applied (set) non-printing area NA3.

The type of the tape T displayed on the display screen may be the one detected or set, and then reported by the tape printing apparatus 1, or may be the one manually set in the data server DS. The data server DS may then determine whether the setting coincides with the reported one.

In this case as well, the print image may be directly edited using a relatively large display screen. More specifically, the tape printing apparatus 1 detects or sets the type of the tape T, and reports the type of the tape T to the data server DS, or the data server DS sets any type of tape T. The data server DS stores the non-printing area information indicating a plurality of different types of non-printing areas (such as the non-printing areas NA1-NA3). One of the non-printing areas (NA3, for example) is selected. The image of the external shape of the tape T and the non-printing area NA3 is displayed on the display screen. The basic image is thus edited so that the print image falls within the external shape of the tape T and within the printing area ES3 (an area other than the non-printing area) on the display screen. The user thus edits the basic image so that the basic image is kept out of the non-printing area NA3 while viewing the type of the tape T and the applied non-printing area NA3. The edited image is supplied to the tape printing apparatus 1 as the print image GS7 for printing.

The type of the displayed tape T may be the type detected or set and then reported by the tape printing apparatus 1, or may be the type set in the data server DS. The data server DS may check to see if the setting coincides with the reported type. At the time of editing the basic image, each process may be tentatively performed as previously discussed even if the set type fails to coincide with the loaded type.

Each of the above referenced processes in the printing system SYS is applicable as a program to be processed by each printing system. The program may be stored in the previously described storage media. By reading the program from such a storage medium, or by downloading the program via a network, and executing the program, the print image matching the non-printing area is printed on each of the plurality of types different in non-printing area (including a special tape having a particular non-printing area) even in a separate type printing system. An appropriate modification is possible without departing from the scope of this invention.

Described below are combinations of the type of the tape T, the printing area, and the non-printing area applicable regardless of whether the standalone tape printing apparatus 1 or the separate type printing system is used.

In each of the above preferred embodiments, the printing area and the non-printing area, matching the special tape Ts having the fold line Sc along the center line of the tape width TW (FIGS. 6D and 7D) have been discussed. A label LS8 is glued onto a tube-like object 80, such as a lead wire and a cable as shown in FIGS. 21A-21C.

The tape T forming the label LS8 is fabricated by laminating a peel tape Ta and a base tape Tb, as the standard tape T. The base tape Tb is fabricated of an image layer Tc serving as a print surface and an adhesive layer Td on the back of the image layer Tc. The base tape Tb (=Tc+Td) may be fully transparent or half transparent. The peel tape Ta is not-light transmissive to allow the color of the base tape Tb to be easily recognized. Preferably, the peel tape Ta is white.

Figure 21A:
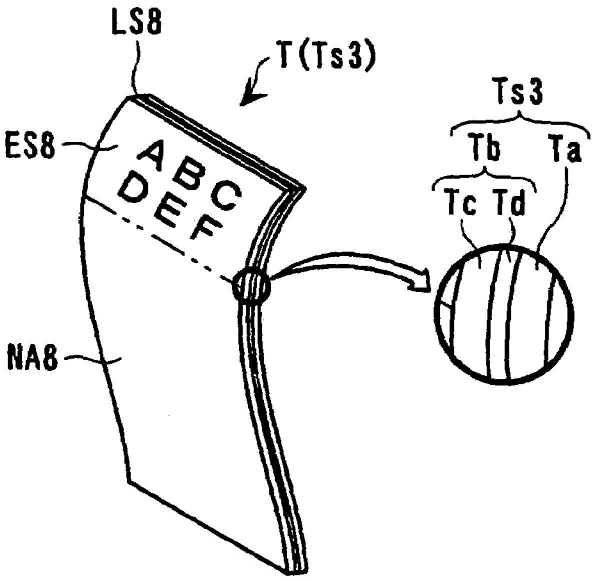
FIGS. 21A-21C illustrate the structure of another special tape and the usage thereof.
Figure 21B:
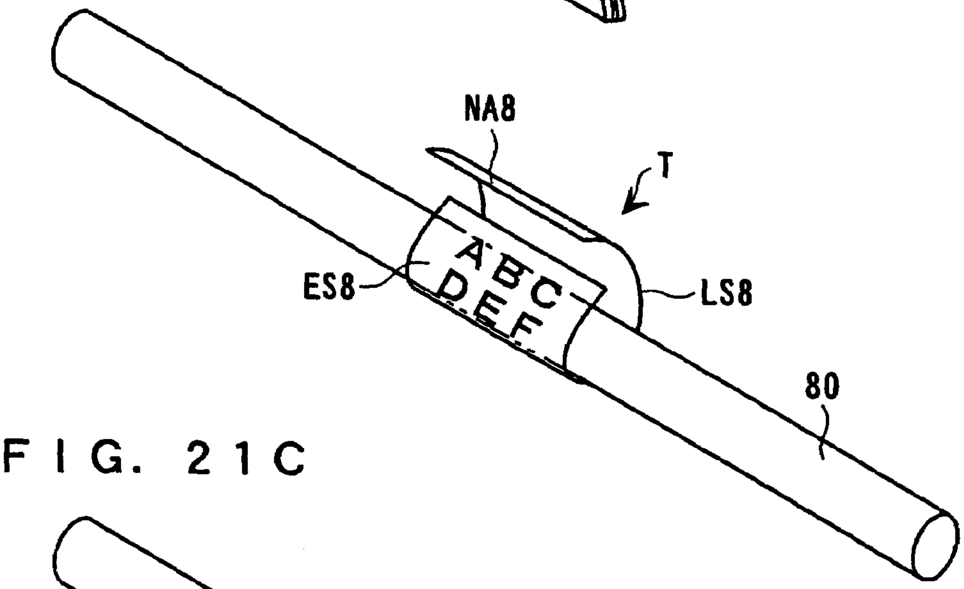
Figure 21C:
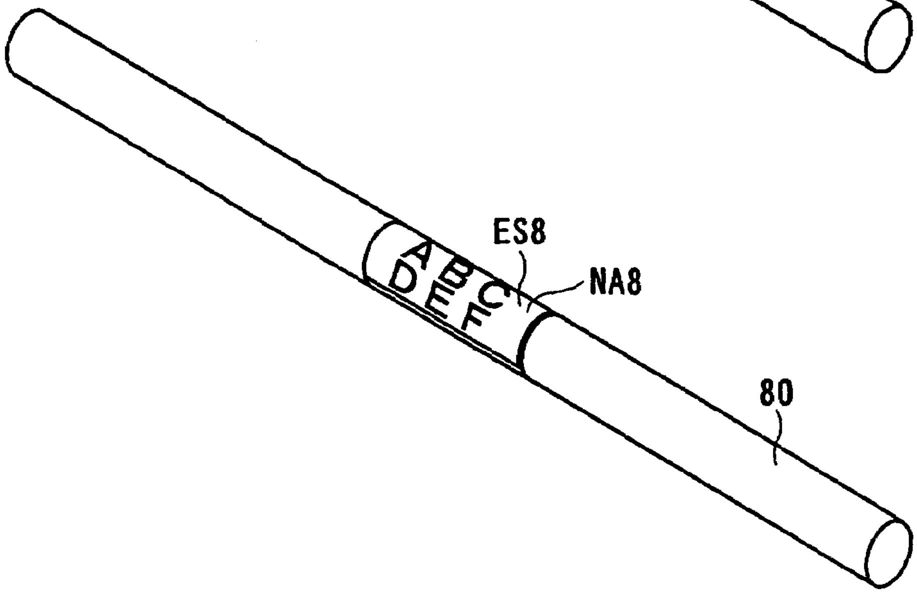
Figure 22A:
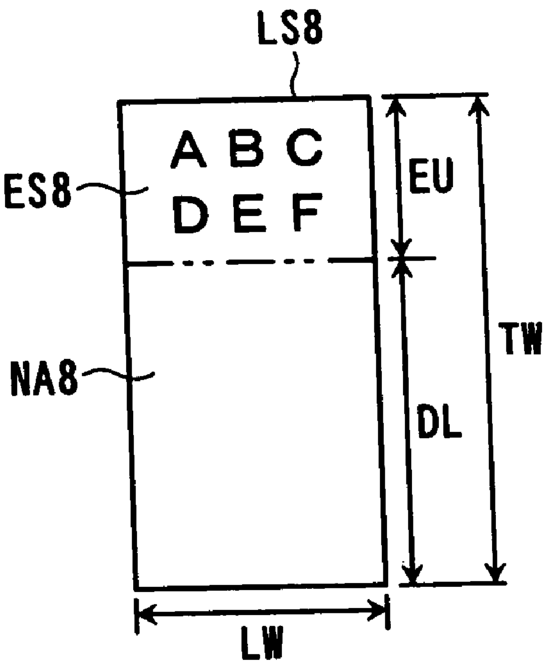
Figure 22B:
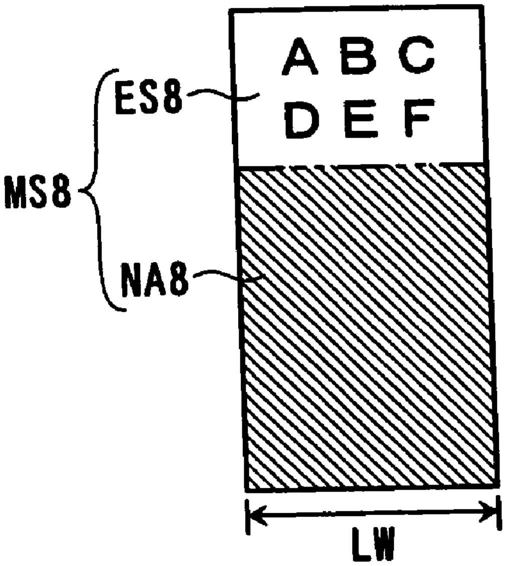

As represented by two-dot-and-dash chain line in FIGS. 21A, 22A and 22B, a non-printing area NA8 and a printing area ES8 are set up so that the label LS8 is wrapped around the object 80, starting with the printing area ES8 as a starting position glued to the object 80 as shown in FIG. 21B and so that the non-printing area NA8 is overlaid on the printing area ES8 as shown in FIG. 21C.

Whether the label LS8 is aligned with the width direction of the tape (with upper effective print length EU and lower non-printing area length DL defined as shown in FIG. 22A) or the longitudinal direction of the tape (with leading effective print length EF and trailing non-printing area length NR defined as shown in FIG. 22C) is determined depending on the content of print (the length of a character string and the number rows of character strings), a tape width TW of the tape T loaded, and the length LW of the label during constant length setting. Alternatively, the alignment of the label LS8 is set as desired, or may be stored in the form of a table and referenced based on the result of detection or the result of setting.

For example, the tape T with the printing area ES8 and the non-printing area NA8 (or a mask image MS8 formed of both areas) defined therewithin is prepared as a sort of special tape Ts (Ts3). The loaded tape T is detected as being the special tape Ts3, or is manually set as being the special tape Ts3. In response to the detection result or the setting result, the printing area ES8 and the non-printing area NA8 are set as the mask image MS8.

A tape T having a background color painted on the printing area ES8, different in feature from other ordinary tapes T, may be prepared as a really special tape Ts3. A widely available transparent color tape T may be used as the special tape Ts3. Without preparing the special tape Ts, the mask image MS8 (the printing area ES8+the non-printing area NA8) is designed to apply to the widely available transparent color tape T.

Figure 23A:
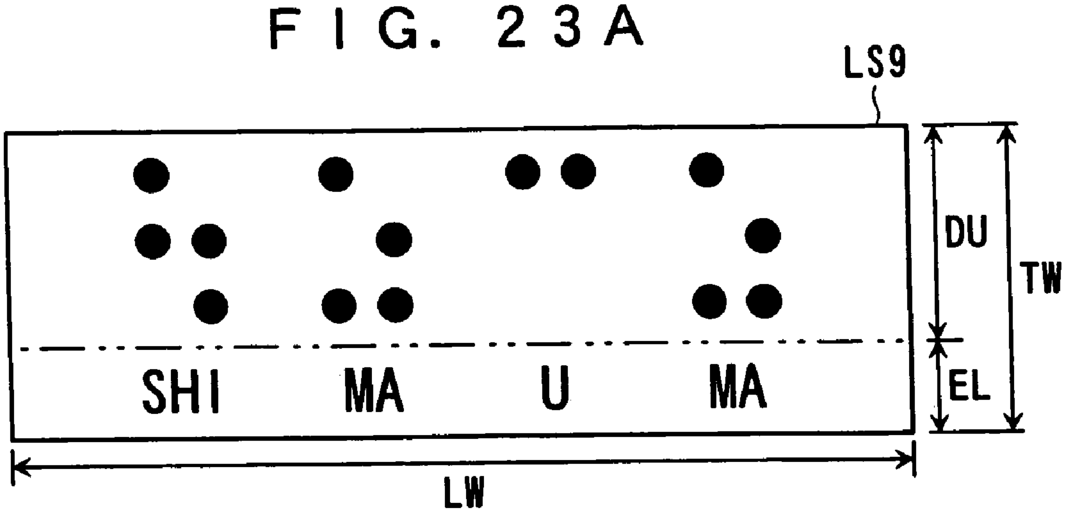
FIGS. 23A and 23B illustrate a label and setting of a mask image (including a printing area and a non-printing area) of another example.
Figure 23B:
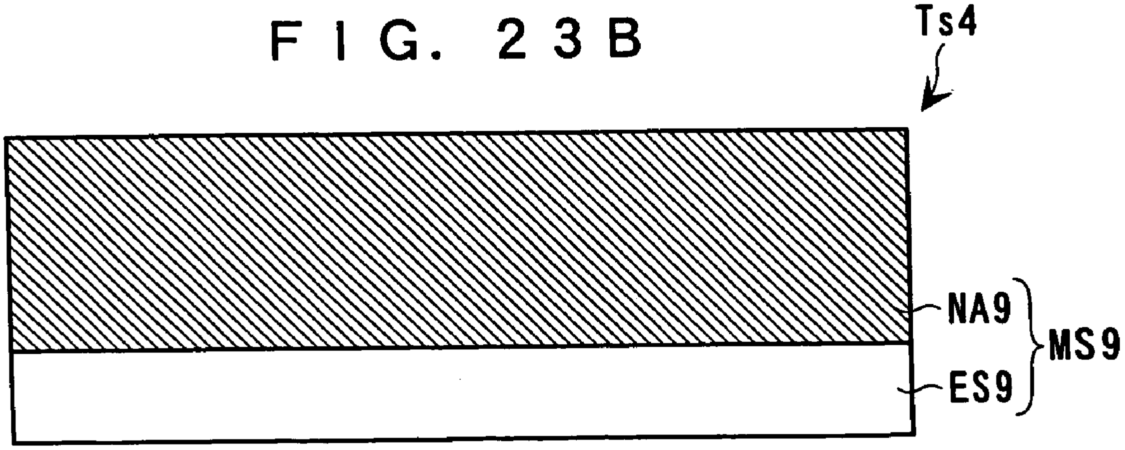

As shown in FIG. 23A, the tape printing apparatus 1 or the printing system SYS prints Braille letters "shi-ma-u-ma" (a Japanese term meaning a "zebra") above two-dot-and-dash chain line and corresponding characters "shi-ma-u-ma" below the two-dot-and-dash chain line on the same tape T as a label LS9. As shown in FIG. 23B, a Braille area is defined as a non-printing area NA9 and the remaining area is defined as a printing area ES9.

A tape T with a mask image MS9 (the printing area ES9+ the non-printing area NA9) defined is prepared as a sort of special tape Ts (as Ts4). The special tape Ts4 is detected or manually set. In response to the detection result or manual setting result, the printing area ES9 and the non-printing area NA9 are set as the mask image MS9.

The same process may be performed on the on any tape T that permits printing and Braille letter formation without preparing a sort of special tape Ts by applying the mask image MS9 (the printing area ES9+the non-printing area NA9).

The mask image MS8 (the printing area ES8+the non-printing area NA8) and the mask image MS9 (the printing area ES9+the non-printing area NA9) are applied in this way. If a relatively large size display screen large enough to recognize each area is available, in other words, if the tape printing apparatus 1 or the printing system SYS is provided with such a large display screen, the basic image may be edited on the display screen. An editing operation is easily performed because the entire image is visibly recognized on the display screen. If the assignment of a desired image to part of or whole of a non-printing area is attempted for printing, an error message may be activated, or an operation guide may be provided to assure the ease of use in the editing operation.

Each of the above referenced processes in the printing system SYS is applicable as a program to be processed by each tape printing apparatus 1 or the printing system SYS. The program may be stored in the previously described storage media. By reading the program from such a storage medium, and executing the program, the print image matching the non-printing area is printed on each of the plurality of types different in non-printing area (including a special tape having a particular non-printing area) even in a separate type printing system. An appropriate modification is possible without departing from the scope of this invention.

What is claimed is:

1. A tape printing apparatus for printing a print image onto a tape of at least one type having a particular non-printing area corresponding to the type of the tape, the apparatus comprising:

basic image storage means for storing basic image data serving as a source of print image data;

non-printing area information storage means for storing non-printing area information indicating the non-printing area corresponding to the type of the tape;

tape type setting means for setting the type information of the tape that is loaded;

print image producing means for producing the print image data with the basic image data masked based on the non-printing area information corresponding to the type information of the loaded tape; and detecting means for detecting whether a fold line is formed in the non-printing area of the tape.

2. A data processing method for a tape printing apparatus for printing a print image onto a tape of at least one type having a particular non-printing area corresponding to the type of the tape, the method comprising:

a basic image storage step for storing basic image data serving as a source of print image data;

a non-printing area information storage step for storing non-printing area information indicating the non-printing area corresponding to the type of the tape;

a tape type setting step for setting the type information of the tape that is loaded;

a print image producing step for producing the print image data with the basic image data masked based on the non-printing area information indicating the non-printing area corresponding to the type information of the loaded tape; and a detecting step for detecting whether a fold line is formed in the non-printing area of the tape.

3. A tape printing apparatus for printing a print image onto a tape of at least one type having a particular non-printing area corresponding to the type of the tape, the apparatus comprising:

basic image storage means for storing basic image data serving as a source of print image data;

non-printing area information storage means for storing non-printing area information indicating the non-printing area corresponding to the type of the tape;

tape type setting means for setting the type information of the tape that is loaded;

display means for displaying on a display screen an image of the external shape of the loaded tape and the non-printing area corresponding to the loaded tape;

print image producing means for producing the print image data by editing a basic image so that the basic image falls within an area in the external shape but outside the non-printing area shown in the display screen; and detecting means for detecting whether a fold line is formed in the non-printing area of the tape.

4. A data processing method for a tape printing apparatus for printing a print image onto a tape of at least one type having a particular non-printing area corresponding to the type of the tape, the method comprising:

a basic image storage step for storing basic image data serving as a source of print image data;

a non-printing area information storage step for storing non-printing area information indicating the non-printing area corresponding to the type of the tape;

a tape type setting step for setting the type information of the tape that is loaded;

a display step for displaying on a display screen an image of the external shape of the loaded tape and the non-printing area corresponding to the loaded tape;

a print image producing step for producing the print image data by editing a basic image so that the basic image falls within an area in the external shape but outside the non-printing area shown in the display screen; and a detecting step for detecting whether a fold line is formed in the non-printing area of the tape.

5. A tape printing apparatus for printing a print image with a non-printing area selectively set within an external shape of a loaded tape, the apparatus comprising:

non-printing area information storage means for storing non-printing area information indicating a plurality of mutually different types of non-printing areas, wherein each of the non-printing areas includes a fold line;

non-printing area selecting means for selecting one of the plurality of types of non-printing areas;

basic image storage means for storing basic image data serving as a source of print image data; and print image producing means for producing the print image data with the basic image data masked based on the non-printing area information of the selected non-printing area.

6. A data processing method for a tape printing apparatus for printing a print image with a non-printing area selectively set within an external shape of a loaded tape, the method comprising:

a non-printing area information storage step for storing non-printing area information indicating a plurality of mutually different types of non-printing areas, wherein each of the non-printing areas includes a fold line;

a non-printing area selecting step for selecting one of the plurality of types of non-printing areas;

a basic image storage step for storing basic image data serving as a source of print image data; and a print image producing step for producing the print image data with the basic image data masked based on the non-printing area information of the selected non-printing area.

7. A tape printing apparatus for printing a print image with a non-printing area selectively set within an external shape of a loaded tape, the apparatus comprising:

non-printing area information storage means for storing non-printing area information indicating a plurality of mutually different types of non-printing areas, wherein each of the non-printing areas includes a fold line;

non-printing area selecting means for selecting one of the plurality of types of non-printing areas;

display means for displaying on a display screen an image of the external shape of the tape and the non-printing area; and print image producing means for producing the print image data by editing the print image so that the print image falls within an area in the external shape but outside the non-printing area shown in the display screen.

8. A data processing method for a tape printing apparatus for printing a print image with a non-printing area selectively set within an external shape of a loaded tape, the method comprising:

a non-printing area information storage step for storing non-printing area information indicating a plurality of mutually different types of non-printing areas, wherein each of the non-printing areas includes a fold line;

a non-printing area selecting step for selecting one of the plurality of types of non-printing areas;

a display step for displaying on a display screen an image of the external shape of the tape and the non-printing area; and a print image producing step for producing the print image data by editing the print image so that the print image falls within an area in the external shape but outside the non-printing area shown in the display screen.

9. A computer-readable medium encoded with a computer program for causing a computer to perform the function of a tape printing apparatus according to one of claims 1, 3, 5, and 7.

10. A computer-readable medium encoded with a computer program for causing a computer to perform a data processing method according to one of claims 2, 4, 6, and 8.

11. A printing system for printing print image data onto a tape of at least one type having a particular non-printing area corresponding to the type of the tape, the system comprising:

a supply apparatus for supplying the print image data through an interface; and a tape printing apparatus for printing on the tape the print image data supplied through the interface, wherein the tape printing apparatus comprises tape type information reporting means for setting type information of a loaded tape and reporting to the supply apparatus the type information; and wherein the supply apparatus comprises:

basic image storage means for storing basic image data serving as a source of the print image data;

modified image producing means for producing modified image data with the basic image data masked based on the non-printing area information corresponding to the reported type information of the tape, wherein the non-printing area information indicates a non-printing area including a fold line; and image data supplying means for supplying the modified image data as the print image data to the tape printing apparatus.

12. A data processing method for a printing system for printing print image data, supplied from a supply apparatus to a tape printing apparatus through an interface, onto a tape of at least one type having a particular non-printing area corresponding to the type of the tape, the method comprising:

a tape type information reporting step for setting type information of the loaded tape and reporting to the supply apparatus the type information;

a basic image storage step for storing basic image data serving as a source of the print image data;

a modified image producing step for producing modified image data with the basic image data masked based on the non-printing area information indicating the non-printing area corresponding to the reported type information of the tape, wherein the non-printing area includes a fold line; and an image data supplying step for supplying the modified image data as the print image data to the tape printing apparatus.

13. A printing system for printing print image data onto a tape of at least one type having a particular non-printing area corresponding to the type of the tape, the system comprising:

a supply apparatus for supplying the print image data through an interface; and a tape printing apparatus for printing on the tape the print image data supplied through the interface, wherein the supply apparatus comprises:

tape type information setting means for setting a loaded tape as a special tape having a fold line;

basic image storage means for storing basic image data serving as a source of the print image data;

modified image producing means for producing modified image data with the basic image data masked based on the non-printing area information corresponding to the type information of the loaded tape; and image data supplying means for supplying the modified image data as the print image data to the tape printing apparatus.

14. A data processing method for a printing system for printing print image data, supplied from a supply apparatus to a tape printing apparatus through an interface, onto a tape of at least one type having a particular non-printing area corresponding to the type of the tape, the method comprising:

a tape type information setting step for setting a loaded tape as a special tape having a fold line;

a basic image storage step for storing basic image data serving as a source of the print image data;

a modified image producing step for producing modified image data with the basic image data masked based on the non-printing area information indicating the non-printing area corresponding to the type of the loaded tape; and an image data supplying step for supplying the modified image data as the print image data to the tape printing apparatus.

15. A printing system for printing print image data onto a tape of at least one type having a particular non-printing area corresponding to the type of the tape, the system comprising:

a supply apparatus for supplying the print image data through an interface; and a tape printing apparatus for printing on the tape the print image data supplied through the interface, wherein the tape printing apparatus comprises tape type information reporting means for setting type information of a loaded tape and reporting to the supply apparatus the type information; and wherein the supply apparatus comprises:

display means for displaying on a display screen an image of the external shape of the tape and the non-printing area, wherein the non-printing area includes a fold line;

modified image producing means for producing modified image data by editing a basic image serving as a source of a print image so that the basic image falls within an area in the external shape but outside the non-printing area shown in the display screen; and image data supplying means for supplying the modified image data as the print image data to the tape printing apparatus.

16. A data processing method for a printing system for printing print image data, supplied from a supply apparatus to a tape printing apparatus through an interface, onto a tape of at least one type having a particular non-printing area corresponding to the type of the tape, the method comprising:

a tape type information reporting step for setting type information of a loaded tape and reporting to the supply apparatus the type information;

a display step for displaying on a display screen an image of the external shape of the tape and the non-printing area, wherein the non-printing area includes a fold line;

a modified image producing step for producing modified image data by editing a basic image serving as a source of a print image so that the basic image falls within an area in the external shape but outside the non-printing area shown in the display screen; and an image data supplying step for supplying the modified image data as the print image data to the tape printing apparatus.

17. A printing system for printing print image data with a non-printing area selectively set within an external shape of a loaded tape, the system comprising:

a supply apparatus for supplying the print image data through an interface; and a tape printing apparatus for printing on the tape the print image data supplied through the interface, wherein the supply apparatus comprises:

non-printing area information storage means for storing non-printing area information indicating a plurality of mutually different types of non-printing areas, wherein each of the non-printing areas includes a fold line;

non-printing area selecting means for selecting one of the plurality of types of non-printing areas;

basic image storage means for storing basic image data serving as a source of the print image data;

modified image producing means for producing modified image data with the basic image data masked based on the non-printing area information of the selected non-printing area; and image data supplying means for supplying the modified image data as the print image data to the tape printing apparatus.

18. A printing system for printing print image data with a non-printing area selectively set within an external shape of a loaded tape, the system comprising:

a supply apparatus for supplying the print image data through an interface; and a tape printing apparatus for printing on the tape the print image data supplied through the interface, wherein the supply apparatus comprises:

display means for displaying on a display screen an image of the selected non-printing area and the external shape of the tape, wherein the non-printing area includes a fold line;

modified image producing means for producing modified image data by editing a basic image serving as a source of a print image so that the basic image falls within an area in the external shape but outside the non-printing area shown in the display screen; and image data supplying means for supplying the modified image data as the print image data to the tape printing apparatus.

19. A data processing method for a printing system for printing print image data, supplied to a tape printing apparatus from a supply apparatus through an interface, with a non-printing area selectively set within an external shape of a tape loaded in the tape printing apparatus, the method comprising:

a non-printing area information storage step for storing non-printing area information indicating a plurality of mutually different types of non-printing areas, wherein each of the non-printing areas includes a fold line;

a non-printing area selecting step for selecting one of the plurality of types of non-printing areas;

a basic image storage step for storing basic image data serving as a source of the print image data;

a modified image producing step for producing modified image data with the basic image data masked based on the non-printing area information of the selected non-printing area; and an image data supplying step for supplying the modified image data as the print image data to the tape printing apparatus.

20. A data processing method for a printing system for printing print image data, supplied to a tape printing apparatus from a supply apparatus through an interface, with a non-printing area selectively set within an external shape of a tape loaded in the tape printing apparatus, the method comprising:

a non-printing area information storage step for storing non-printing area information indicating a plurality of mutually different types of non-printing areas;

a non-printing area selecting step for selecting one of the plurality of types of non-printing areas;

a display step for displaying on a display screen an image of the selected non-printing area and the external shape of the tape, wherein the non-printing area includes a fold line;

a modified image producing step for producing modified image data by editing a basic image serving as a source of a print image so that the basic image falls within an area in the external shape but outside the non-printing area shown in the display screen; and an image data supplying step for supplying the modified image data as the print image data to the tape printing apparatus.

21. A computer-readable medium encoded with a computer program for causing a computer to perform the function of a printing system according to one of claims 11, 13, 15, 17, and 18.

22. A computer-readable medium encoded with a computer program for causing a computer to perform a data processing method according to one of claims 12, 14, 16, 19, and 20.

* * * * *